United States Patent
Setiawan et al.

(10) Patent No.: US 6,763,285 B2
(45) Date of Patent: Jul. 13, 2004

(54) ADAPTIVE COMPENSATION OF SENSOR RUN-OUT AND MASS UNBALANCE IN MAGNETIC BEARING SYSTEMS WITHOUT CHANGING ROTOR SPEED

(75) Inventors: Joga Dharma Setiawan, Andover, MA (US); Ranjan Mukherjee, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 222 days.

(21) Appl. No.: 09/934,419

(22) Filed: Aug. 21, 2001

(65) Prior Publication Data

US 2003/0038552 A1 Feb. 27, 2003

Related U.S. Application Data

(60) Provisional application No. 60/226,783, filed on Aug. 21, 2000.

(51) Int. Cl.[7] .......................... G01M 1/30; G01M 1/00; H02K 7/09
(52) U.S. Cl. .................... 700/279; 310/90.5; 310/95; 310/323.02; 310/323.21; 73/1.14; 73/66
(58) Field of Search .................... 700/279; 310/90.5, 310/95, 323.21, 323.02; 73/1.14, 66

(56) References Cited

U.S. PATENT DOCUMENTS

| 5,998,899 A | * 12/1999 | Rosen et al. | 310/90.5 |
| 6,160,336 A | * 12/2000 | Baker et al. | 310/74 |

* cited by examiner

*Primary Examiner*—Leo Picard
*Assistant Examiner*—Charles Kasenge
(74) *Attorney, Agent, or Firm*—Ian C. McLeod

(57) ABSTRACT

The present invention provides a method and system for stabilizing a rotor about its geometric center in a magnetic bearing system at a constant rotor speed. In the method, the controller for controlling the magnetic bearing uses an adaptive control algorithm which simultaneously identifies and compensates for synchronous sensor runout and rotor mass unbalance while determining a control action that drives the rotor rotating at a constant speed to its geometric center. The identification of sensor runout and mass unbalance is by varying the magnetic stiffness which is achieved by perturbation of the bias currents in opposing electromagnet coils in a manner that does not alter the equilibrium of the rotor while it is rotating at a constant speed.

26 Claims, 6 Drawing Sheets x1 = Geometric Center, x2 = Mass Center

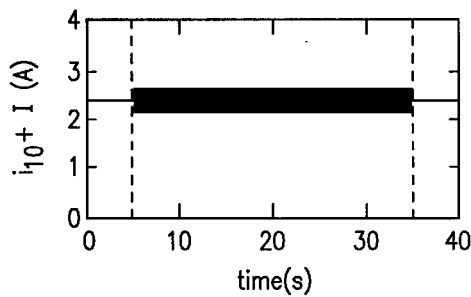
FIG. 7A
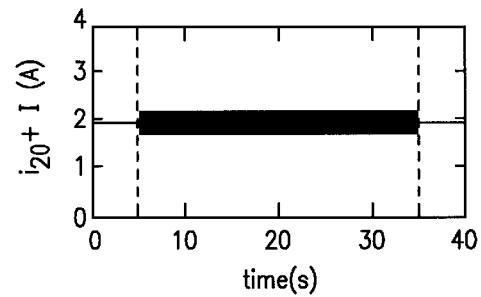
FIG. 7B
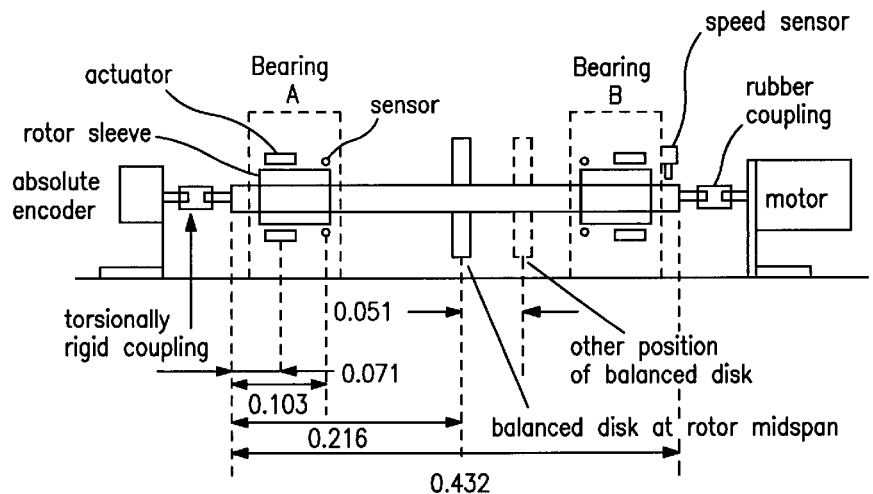
FIG. 8
FIG. 9A
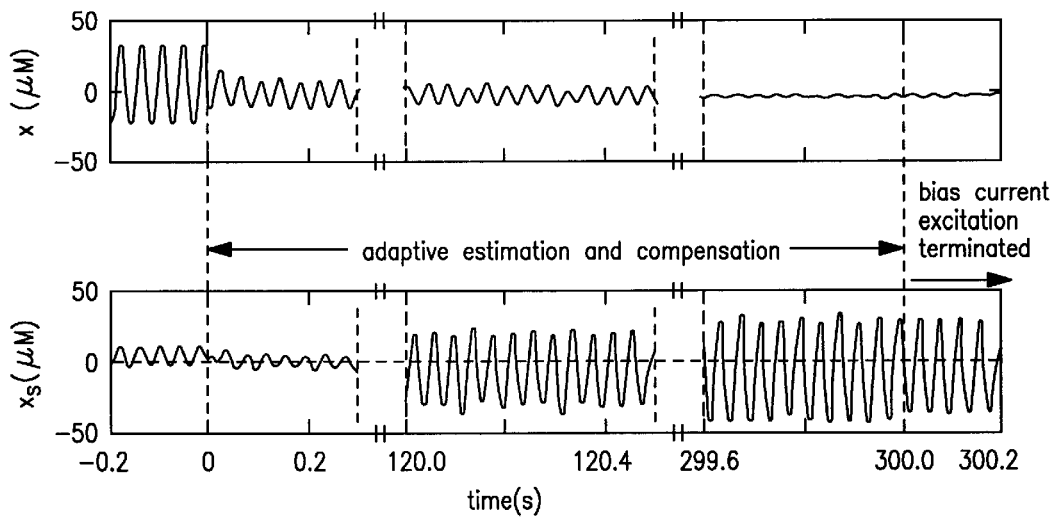
FIG. 9B

US 6,763,285 B2

ADAPTIVE COMPENSATION OF SENSOR RUN-OUT AND MASS UNBALANCE IN MAGNETIC BEARING SYSTEMS WITHOUT CHANGING ROTOR SPEED

CROSS-REFERENCE TO RELATED APPLICATION

This application claims priority to Provisional Application No. 60/226,783, which was filed Aug. 21, 2000.

STATEMENT REGARDING FEDERALLY SPONSORED RESEARCH OR DEVELOPMENT

Not Applicable.

Reference to a "Computer Listing Appendix Submitted on a Compact Disc"

A Computer Program Listing Appendix of the programming language, which can be used to practice the method of the present invention, is submitted with this application on two identical compact discs (CD). The compact discs are labeled Copy 1 and Copy 2. Copy 1 is entitled "010811_1041" and copy 2 is entitled "010811_1038." Each CD is hereby incorporated herein by reference.

The CDs are write-only and are IBM-PC compatible. Each compact disc contains ASCII text files "data_feb25.m" and "adapt.m" disclosing a computer program and parameter values, respectively, which can be used to demonstrate the method and system of the present invention. The file "data_feb25.m" was created Jul. 17, 2000, and the file contains 2,202 bytes. The file "adpat.m" was created Feb. 27, 2000, and the file contains 137 bytes.

BACKGROUND OF THE INVENTION

1. Field of the Invention

The present invention relates to a method and system for stabilizing a rotor about its geometric center in a magnetic bearing system at a constant rotor speed. In the method, the controller for controlling the magnetic bearing uses an adaptive control algorithm which simultaneously identifies and compensates for synchronous sensor runout and rotor mass unbalance while determining a control action that drives the rotor rotating at a constant speed to its geometric center. Sensor runout and mass unbalance is determined by varying the magnetic stiffness of the magnetic bearing which is achieved by perturbation of the bias currents in opposing electromagnet coils using an algorithm that does not alter the equilibrium of the rotor while the rotor is rotating at a constant speed.

2. Description of Related Art

Periodic disturbances are common in rotating machinery. Compensating for such disturbances is critical to the performance of systems using active magnetic bearings. The two dominant sources of periodic disturbances in magnetic bearings are synchronous sensor runout and mass unbalance. Mass unbalance, which results from a lack of alignment between the principal axis of inertia and the geometric axis of the rotor, generates a force disturbance synchronous with rotor angular speed. Runout originates from non-uniform electrical and magnetic properties around the sensing surface and lack of concentricity of the sensing surface. It generates a disturbance in rotor position at multiple harmonics of the frequency of rotation. Both synchronous sensor runout and mass unbalance are unavoidable since they result from manufacturing imperfections and cause rotor vibration, degrade performance, and can lead to instability if they are not adequately compensated.

Although the problem of simultaneous compensation of mass unbalance and synchronous sensor runout has appeared in the literature only recently (Kanemitsu, et al., Identification and Control of Unbalance and Sensor Runout on Rigid Active Magnetic Bearing Systems, $5^{th}$ Int. Symp. on Magnetic Suspension Technol., Santa Barbara, Calif. (1999); Setiawan, et al., Adaptive Compensation of Sensor Runout and Mass Unbalance in Magnetic bearing Systems, IEEE/ASME Int. Conf. on Advanced Intelligent Mechatronics, Atlanta, Ga. (1999); Setiawan, et al., ASME J. Dyn. Sys. Meas. and Cont. 123: 211 (2001); Sortore, Observer Based Critical Response in Rotating Machinery, PhD Dissertation, University of Virginia, Charlottesville, Va. (1999)), a large volume of research exists on compensation of the individual disturbances. Some of the early work on mass unbalance compensation is based on insertion of a notch filter in the control loop (Beatty, Notch Filter Control of Magnetic Bearings, MS Thesis, Mass. Institute of Technology, Cambridge, Mass. (1988)). The drawback of this approach stems from negative phase of the notch transfer function which can reduce the stability margin of the closed-loop system and lead to instability (Bleuler, et al., IEEE Trans. on Control Sys. Tech. 2: 280–289 (1994); Na and Park, J. Sound Vibration 201: 427–435 (1997)). Another popular approach is adaptive feedforward control (Hu and Tomizuka, ASME J. Dyn. Sys. Meas., and Cont. 115: 543–546 (1993); Shafai, et al., IEEE Control Sys. 14: 4–13 (1994)), where Fourier coefficients of the disturbance are estimated and cancelled on-line. Operationally, these controllers resemble notch filters (Na and Park, ibid.) and can result in instability if designed without considering the underlying structure of the closed-loop system. To preserve stability, Herzog, et al. (IEEE Trans. on Control Sys. Technol. 4: 580–586 (1996)) developed the generalized notch filter and Na and Park (ibid.) proposed variation of the least mean square algorithm. Other approaches that compensate for mass unbalance while ensuring stability include adaptive auto-centering (Lum, et al., IEEE Trans. on Control Sys. Technol. 4: 587–597 (1996)) and output regulation with internal stability (Matsumura, et al., Modeling and Control of Magnetic Bearing Systems Achieving a Rotation Around the Axis of Inertia, $2^{nd}$ Int. Symp. on Magnetic Bearings, Tokyo, Japan. pp 273–280 (1990)). Both of these approaches stabilize the rotor about its mass center.

Though mass unbalance compensation has been widely studied with the objective of stabilization about the mass center, most commercial applications require geometric centering to avoid seal wear. The problem of geometric center stabilization has been addressed by a few researchers (Hisatani and Koizumi, Adaptive Filtering for Unbalance Vibration Suppression, $4^{th}$ Int. Symp. on Magnetic Bearings, ETH Zurich, Switzerland (1994); Song and Mukherjee, Integrated Adaptive Robust Control of Magnetic bearings, IEEE Int. Conf. on System, Man, and Cybernetics, Beijing, China (1996)), but more general results (Reinig and Desrochers, ASME J. Dyn. Sys. Meas. Cont. 108: 24–31 (1986); Mizuno, An Unified Approach to Controls for Unbalance Compensation in Active Magnetic Bearings, IEEE Int. Conf. on Control Applications, Italy (1998)) establish that mass or geometric center stabilization can be achieved through cancellation of the disturbance in current or displacement signal, respectively. In a general approach for disturbance attenuation, Knospe, et al., J. Vibration and Control 2: 33–52 (1996); Knospe, et al., ASME J. Dyn. Sys. Meas. Cont. 119: 243–250 (1997)) claimed that any form of vibration, which can be measured, can be attenuated using a pseudo-inverse of the pre-computed influence coefficient matrix. The performance of the algorithm amidst uncertainties was investigated and experiments used to demonstrate effectiveness. The method decouples the problem into two independent tasks, and while it has been demonstrated to work successfully, there is no theoretical basis for stability of the two interacting processes. Other approaches employed for disturbance compensation include robust control designs (Fujita, et al., Experiment on the Loop Shaping Based H-Infinity Control of Magnetic Bearing, Proc. Am. Control Conf. (1993); Rutland, et al., Comparison of Controller Designs for attenuation of Vibration in a Rotor Bearing System under Synchronous and Transient Conditions, $4^{th}$ Int. Symp. on Magnetic Bearings, ETH Zurich, Switzerland, pp 107–112 (1994); Setiawan, et al., ibid. (1999)), Q-parameterization control (Mohamed et al., Q-parameterization Control of Vibrations in a Variable Speed Magnetic Bearing, IEEE Int. Conf. on Control Applications, Hartford, Conn. (1997)), and off-line adaptation (Kim and Lee, IEEE/ASME Trans. on Mechatronics 2:51–57 (1997)). Among them, the work by Kim and Lee (ibid.) and Setiawan et al., ibid. (2001) address the problem of sensor runout compensation.

Unfortunately, none of the above approaches lend themselves to mass unbalance compensation in the presence of significant synchronous sensor runout. This problem, widely acknowledged in the literature but essentially unsolved, stems from lack of observability of disturbances with the same frequency content. A credible way to distinguish between these disturbances is to perturb the operating conditions of the plant or its parameters, but recent research (Kanemitsu, et al., ibid.; Setiawan, et al., ibid. (1999); Sortore, ibid.) that proposes rotor speed variation is not acceptable for a number of applications. Therefore, there still remains a need for a way to distinguish between these disturbances at constant rotor speed. This invention presents a method for controlling magnetic bearings that can distinguish between the two disturbances and enable the rotor to be stabilized around its geometric center and thereby improve the usefulness of magnetic bearings.

SUMMARY OF THE INVENTION

The present invention provides a method and system for stabilizing a rotor about its geometric center in a magnetic bearing system at a constant rotor speed. In the method, the controller for controlling the magnetic bearing uses an adaptive control algorithm which simultaneously identifies and compensates for synchronous sensor runout and rotor mass unbalance while determining a control action that drives the rotor rotating at a constant speed to its geometric center. Sensor runout and mass unbalance is identified by varying the magnetic stiffness which is achieved by perturbation of the bias currents in opposing electromagnet coils using an algorithm that does not alter the equilibrium of the rotor while it is rotating at a constant speed.

Therefore, the present invention provides a method for simultaneous identification and compensation of sensor runout and mass unbalance of a rotor rotating at a constant speed in a magnetic bearing which is under the control of a controller for controlling the currents in the electromagnetic coils in the magnetic bearing, comprising (a) varying the magnetic stiffness of the magnetic bearing by excitation of bias currents in the electromagnet coils of the magnetic bearing using an algorithm which causes persistency of excitation for identification of synchronous periodic disturbances such as sensor runout and mass unbalance by continuously varying over time the currents to the electromagnetic coils in the magnetic bearing about their nominal values as a function of an independent time function to generate a series of excitations in the currents levitating a rotor in the magnetic bearing without disturbing the equilibrium of the rotor rotating at the constant speed; (b) identifying the sensor runout and mass unbalance for an excitation in the series of excitations in the currents using a second algorithm consisting of adaptation laws which determines values for the sensor runout and mass unbalance at the excitation; (c) compensating for the sensor runout and mass unbalance using a third algorithm that uses the values identified from step (b) to determine a control action that modifies the current levitating the rotor; and (d) repeating steps (a) to (c) until the rotor is stabilized about its geometric center as it is rotating at the constant speed in the magnetic bearing.

In a further embodiment of the above method, after the rotor has been stabilized about its geometric center, steps (a) to (d) are repeated at a regular interval to maintain the rotor about its geometric center.

The present invention further provides a method for stabilizing a rotor rotating at a constant speed about its geometric center in a magnetic bearing without disturbing the equilibrium of the rotor rotating at the constant speed comprising (a) providing a magnetic bearing including plurality of position sensor means wherein each position sensor means provides a signal as a measure of the position of the rotor in the air gap and a plurality of electromagnetic coils of the magnetic bearing; (b) providing a rotational speed sensor means for determining the speed of the rotor of the magnetic bearing; (c) providing an angular position sensor means for determining the angular position of the rotor in the magnetic bearing; (d) providing a generator means for providing currents to each of the electromagnetic coils for levitating the rotor in the magnetic bearing; and (e) providing a controller means including an adaptive control framework which over a period of time is sufficient to stabilize the rotor at its geometric center wherein the adaptive control framework uses a persistency of excitation algorithm to direct the generator means to introduce over time a series of successive excitations provided to the electromagnetic coils wherein each excitation changes the stiffness of the magnetic field of the magnetic bearing which over time generates persistency of excitation without affecting equilibrium of the rotor, which allows the controller means to simultaneously identify synchronous periodic disturbances in the rotor rotating at constant speed for each excitation measured by the position sensors using an adaptation laws algorithm and determine a control action using a control action algorithm that compensates for the synchronous periodic disturbances for the excitation measured by the position sensor which alters the currents provided to the electromagnetic coils by the generator means for levitating the rotor rotating at the constant speed and to drive the rotor to its geometric center which for each successive excitation drives the rotor closer to its geometric center until the rotor is stabilized about its geometric center.

In a further embodiment of the present invention, the periodic disturbances are synchronous sensor runout and mass unbalance.

In a further still embodiment of the method, after the rotor has been stabilized about its geometric center, the controller at regular intervals redetermines the geometric center of the rotor using the persistency of excitation algorithm, the adaptation laws algorithm, and the control action algorithm to maintain the rotor about its geometric center.

The present invention further provides a method for stabilizing over time a rotor rotating at a constant speed about its geometric center in a magnetic bearing without disturbing the equilibrium of the rotor rotating at the constant speed which comprises (a) providing a controller for the magnetic bearing that determines a current to each electromagnetic coils in the magnetic bearing to levitate the rotor about its geometric center; and (b) providing a program for the controller comprising (i) a persistency of excitation algorithm that enables the controller to continuously vary over time the currents to the electromagnetic coils in the magnetic bearing about their nominal values as a function of an independent time function which generates a series of excitations without disturbing the equilibrium of the rotor rotating at the constant speed (ii) an adaptation laws algorithm that enables the controller in response to an excitation in the series and a signal from a position sensor that provides signals corresponding to the position between the rotor and the electromagnetic coils of the magnetic bearing corresponding to the excitation in the series to determine sensor runout and mass unbalance for the rotor rotating at the constant speed; and (iii) a control action algorithm that enables the controller in response to the sensor runout and mass unbalance determined using the adaptation laws algorithm to determine a control action that modifies the currents for levitating the rotor to compensate for the sensor runout and mass unbalance determined for the excitation in the series, wherein the program enables the controller to modify the currents for levitating and stabilizing the rotor about its geometric center.

In further embodiment of the above method, the nominal values of the bias currents in the opposed paired electromagnetic coils are those that provide a force that cancels the weight of the rotor when the rotor is geometrically centered.

In an embodiment further still of the above method, after the rotor has been stabilized about its geometric center, the controller at regular intervals redetermines the geometric center of the rotor using the bias current excitation algorithm, the adaptation laws algorithm, and the control action algorithm to maintain the rotor about its geometric center.

In any one of the above embodiments of the method of the present invention, the magnetic bearing is a radial magnetic bearing or a thrust magnetic bearing.

The present invention further provides in a magnetic bearing apparatus comprising a stator assembly with a radial arrangement of a plurality of electromagnetic coils mounted in a stator assembly around a cylindrical opening in which a magnetic field is generated by each of the electromagnetic coils for levitating a rotor, the improvement which comprises: control means for stabilizing the rotor when rotating at a constant speed wherein the control means varies magnetic stiffness of the magnetic bearing by introducing excitations into the currents to the electromagnetic coils wherein the excitations to the current to one of the electromagnetic coils is proportionally related to the excitations to the current to the other electromagnetic coils which generates persistency of excitation without disturbing the equilibrium of the rotor rotating at a constant speed and which enables the control means to simultaneously identify and compensate for sensor runout and mass unbalance in determining a control action for stabilizing the rotor about its geometric center.

The present invention further provides a computer simulation model for determining the parameters for stabilizing a rotor rotating at a constant speed in a magnetic bearing apparatus, comprising (a) providing a computer program comprising (i) a persistency of excitation algorithm that continuously varies over time the currents to the electromagnetic coils in the magnetic bearing about their nominal values as a function of an independent time function which generates a series of excitations without disturbing the equilibrium of the rotor rotating at the constant speed; (ii) an adaptation laws algorithm that in response to an excitation in the series and a signal corresponding to the rotor position in the air gap between the rotor and the electromagnetic coils corresponding to the excitation in the series determines sensor runout and mass unbalance for the rotor rotating at the constant speed; and (iii) a control action algorithm that in response to the sensor runout and mass unbalance determined using the adaptation laws algorithm to determine a control action that modifies the currents for levitating the rotor to compensate for the sensor runout and mass unbalance determined for the excitation in the series, wherein the program modifies the currents for levitating the rotor and stabilizing the rotor about its geometric center.

The above computer simulation model is useful for simulation of a radial magnetic bearing or a thrust magnetic bearing.

The present invention further provides a system for simultaneous identification and compensation of sensor runout and mass unbalance of a rotor rotating at a constant speed in a magnetic bearing which is under the control of a controller for controlling the currents to the electromagnetic coils in the magnetic bearing, comprising (a) varying the magnetic stiffness of the magnetic bearing by excitation of currents in the electromagnet coils of the magnetic bearing using an algorithm which causes persistency of excitation for identification of the synchronous disturbances, such as sensor runout and unbalance, by continuously varying over time the currents to the electromagnetic coils in the magnetic bearing about their nominal values as a function of an independent time function to generate a series of excitations in the currents levitating a rotor in the magnetic bearing without disturbing the equilibrium of the rotor rotating at the constant speed; (b) identifying the sensor runout and mass unbalance for an excitation in the series of excitations in the currents using a second algorithm consisting of adaptation laws which determines values for the sensor runout and mass unbalance at the excitation; (c) compensating for the sensor runout and mass unbalance using a third algorithm that uses the values from step (b) to determine a control action that modifies the current levitating the rotor; and (d) repeating steps (a) to (c) until the rotor is stabilized about its geometric center as it is rotating at the constant speed in the magnetic bearing.

In a further embodiment of the above system, after the rotor has been stabilized about its geometric center, steps (a) to (d) are repeated at a regular interval maintain the rotor about its geometric center.

In an embodiment further still of the above system, the magnetic bearing is a radial magnetic bearing or a thrust magnetic bearing.

In any one of the above embodiments of the present invention, the algorithm for persistency of excitation nominally chooses bias currents in the opposite magnetic coils to provide a force that cancels weight of the rotor when it is geometrically centered wherein the bias currents nominally satisfy the relation $$k(i^2_{10} - i^2_{20}) = m\bar{g}l^2$$

wherein k is a magnetic force constant, m is the rotor mass, $\bar{g}$ is acceleration due to gravity, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10}=i^*_{10}-\delta_1, \quad i_{20}=i^*_{20}+\delta_2$$

wherein $i^*_{10}$ and $i^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2=(i^*_{10}/i^*_{20})\delta_1, \quad \delta_1=A\sin(\omega_e t), \quad \omega_e<\omega$$

wherein A is the amplitude of the bias current excitation, $\omega_e$ is the frequency of the bias current excitation, and $\omega$ is the angular rotation of the rotor.

OBJECTS

Therefore, it is an object of the present invention to provide a method and system for stabilizing a rotor about its geometric center in a magnetic bearing system at a constant rotor speed.

In particular, it is an object of the present invention to provide a method and system for stabilizing a rotor about its geometric center in a magnetic bearing by identifying and compensating for synchronous periodic disturbances such as sensor runout and mass unbalance while the rotor is rotating at a constant speed.

These and other objects of the present invention will become increasingly apparent with reference to the following drawings and preferred embodiments.

DESCRIPTION OF THE DRAWINGS

FIG. 7A shows a plot of the current in the top coil.

FIG. 7B shows a plot of the current in the bottom coil.

FIG. 8 is a schematic diagram of the experimental test-rig.

FIG. 9A is a plot showing the time history of rotor geometric center position.

FIG. 9B is a plot showing the time history of position sensor signal.

DETAILED DESCRIPTION OF THE INVENTION

Figure 1:
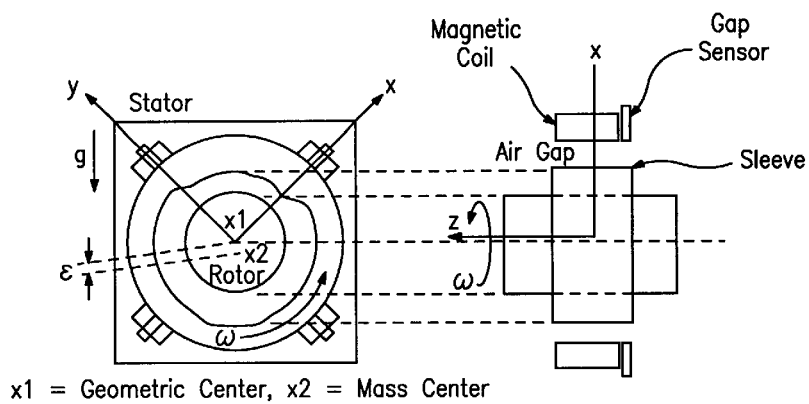
FIG. 1 shows a diagram of a magnetic bearing system with mass unbalance and synchronous sensor runout.

All patents, patent applications, government publications, government regulations, and literature references cited in this specification are hereby incorporated herein by reference in their entirety. In case of conflict, the present description, including definitions, will control.

A computer program comprising sub-programs and files and which is one embodiment of a computer program that can be used to practice the present invention, is provided in the file entitled "data-feb25.m" along with parameter values in "adpdat.m" is set forth in the Appendix on a compact disc (CD); copy 1 entitled "010811_1041" and copy 2 entitled "010811-1038." Two CDs have been provided. Each CD, designated as Copy 1 or Copy 2, is identical and each CD is hereby incorporated herein by reference. Each CD contains the computer program codes and files enumerated in Example 6.

Magnetic bearings incorporate three distinct technologies: actuators and sensors, the control system, and the control algorithms. The actuators and sensors are the electromechanical hardware by which input signals are collected, and supporting forces applied to the machine on which they are installed. The control system provides the power and control electronics for signal conditioning prior to calculation of correcting forces and resultant commands to the power amplifiers for each axis of control. Control algorithms are the software programs used in digital magnetic bearing system control including the processing of the input signals after conditioning and calculation of the command signals to the power amplifiers. The control system for a magnetic bearing comprises a plant controller, power amplifiers, and a power supply. The control system further includes a user interface, which can be a computer, for inputting information necessary for operation of the magnetic bearings.

There are two main types of magnetic bearings: radial magnetic bearings and axial or thrust magnetic bearings. For radial magnetic bearings, the magnetic bearing actuator consists of a single stator and a rotor which passes through the stator. The stator consists of poles with coils wound about it dividing the stator into three, four or more segments. Each quadrant acts as an electromagnet when electric current from a power amplifier is applied. The magnetic bearing provides attractive electromagnetic suspension of the rotor by sending electric current to the stator to create a magnetic field around each segment which attracts the rotor. Because the quadrants are balanced relative to each other, the rotor is suspended within the stator. An axial or thrust magnetic bearing consists of two stators mounted on opposite sides of the rotor disk. Axial magnetic bearings can counteract axial forces.

Preferably, adjacent to each of the electromagnetic coils is a position sensor that continuously measures the air gap between the rotor and the electromagnetic coil. In general, the position sensor is calibrated to produce a null voltage when the rotor is in the desired position which is the geometric center and a positive signal when the rotor is above the desired position and a negative voltage when the rotor is below the desired position. The position sensor transmits the voltage signal it produces to a plant controller.

In the prior art, the plant controller periodically samples the voltage signal obtained by the position sensors. The controller comprises anti-aliasing filters, analog to digital (A/D) converters, digital signal processors, and amplifiers such as the pulse-width modulation (PWM) amplifiers. The anti-aliasing filters remove high frequency noise from the voltage signal which can interfere with accurately determining the position of the rotor and can lead to amplification of noise. After passing through the anti-aliasing filters, the voltage signal is converted by the A/D converter to a form that can be processed by the digital signal processor. The digital signal processor and the PWM amplifier control an output that is proportional to the amount of current necessary to correct a detected position error of the rotor. The error between the actual and necessary current is provided to PWM generators which creates the waveform sent to the amplifiers. In response, the amplifiers provide the proper control current to the electromagnetic coils to place the rotor in the desired position. In general, the sampling and delivery of the proper control current is done at a frequency of 10 to 15 kHz.

As a rotor in a magnetic bearing is rotating at a constant speed, synchronous periodic disturbances, which are a result of manufacturing imperfections in the rotor and magnetic bearing and external factors acting on the magnetic bearing can tend to destabilize the rotor as it is rotating at the constant speed. The synchronous periodic disturbances that affect the stability of the rotating rotor are mass unbalance, which generates disturbance at the first harmonic of rotation, and sensor runout, which generates disturbance at multiple harmonics. While mass unbalance results from a lack of alignment between the geometric axis and the principal axis of inertia, sensor runout results from lack of concentricity of the sensing surface and non-uniform electrical and magnetic properties around it. These two disturbances cause the rotor rotating at a constant speed to fall out of alignment with its geometric center which if not compensated for leads to rotor instability, excessive seal wear, and can eventually lead to rotor failure.

While there has been much effort directed towards developing a method for stabilizing a rotor rotating in a magnetic bearing by compensating for the two individual periodic disturbances, no method has been developed that is able to simultaneously identify and compensate for sensor runout in the presence of significant mass unbalance in a rotor rotating at a constant speed. That is because the frequency content of the two disturbances is the same which means that the two disturbances cannot be simultaneously observed. Because the two disturbances cannot be simultaneously observed, the disturbances they cause cannot be compensated for in a rotor that is rotating at a constant speed. They can be separately observed, however, by changing the speed of the rotor but then the rotor is no longer rotating at a constant speed, which is unacceptable for most applications.

The present invention solves the inability to stabilize a rotor about its geometric center while the rotor is rotating at a constant speed. The method of the present invention stabilizes a rotor rotating at a constant speed about its geometric center by varying the stiffness of the magnetic field levitating the rotor. The variation in magnetic stiffness is achieved by continuously varying the bias currents to the electromagnetic coils of the stator about their nominal values as a function of an independent time function. These varying perturbations or excitations in the bias currents generates a persistency of excitation condition necessary for identification of the synchronous disturbances, namely sensor runout and unbalance. The algorithm for introducing these perturbations into the bias currents does not disturb the equilibrium of the rotor as it is rotating in the magnetic bearing at a constant speed. In general, the nominal values are the bias currents that are nominally chosen to provide the force that cancels the weight of the rotor when the rotor is geometrically centered.

The persistency of excitation in the bias currents enables the sensor runout and mass unbalance components of the periodic disturbances to be identified as the rotor is rotating at a constant speed and control actions that compensate for the sensor runout and mass unbalance to be determined which stabilize the rotor about its geometric center as it is rotating at the constant speed. This ability to simultaneously identify and compensate for sensor runout and mass unbalance without disturbing the equilibrium of the rotor while it is rotating at a constant speed is a significant improvement over the prior art.

The method uses an adaptive control framework comprising several algorithms which are used by a controller operating the magnetic bearing to continuously over time simultaneously identify the sensor runout and mass unbalance components of the periodic disturbances that are affecting the rotor rotating at a constant rotor speed and determine control actions that compensate for these periodic disturbances by modifying the currents in the opposite electromagnetic coils of the magnetic bearing providing the levitation of the rotor. Over time, the cumulative effect of these modifications to the currents is to drive the rotor to it geometric center and thereby stabilize the rotor about its geometric center.

The important elements of the present invention comprise the following (1) an "persistency of excitation" algorithm that enables relatively small excitations to the bias current to be made without disturbing the equilibrium of the rotor as it is rotating at a constant speed, which causes variation in magnetic stiffness and thereby generating persistency of excitation; (2) an "adaptation law" algorithm that in concert with the "persistency of excitation" algorithm determines the sensor runout and mass unbalance; and (3) a "control action" algorithm that determines a control action in terms of currents for levitating the rotor wherein the "control action" has compensated for the sensor runout and mass unbalance determined by the "adaptation laws" thereby driving the rotor to its geometric center. The following provides examples of equations for each of the above algorithms comprising the adaptive control framework that can be used by a controller in a magnetic bearing system to perform the method of the present invention.

Persistency of excitation is effected by the following. The algorithm typical for any magnetic bearing nominally chooses the bias currents in the opposite magnetic coils to provide a force that cancels weight of the rotor when it is geometrically centered wherein the bias currents nominally satisfy the relation $$k(i^2_{10} - i^2_{20}) = m\bar{g}l^2 \qquad \text{Eq. 28}$$

wherein k is a magnetic force constant, m is the rotor mass, $\bar{g}$ is acceleration due to gravity in the direction of the axis, l is nominal air gap between the rotor and electromagnetic coils, and $i_{10}$ and $i_{20}$ are constants for the bias currents for the opposite electromagnetic coils, and then the excitations in the opposite electromagnetic coils are determined according to the relations $$i_{10} = i^*_{10} + \delta_1, \; i_{20} = i^*_{20} + \delta_2 \qquad \text{Eq. 29}$$

wherein $i^*_{10}$ and $i^*_{20}$ are constants and $\delta_1$ and $\delta_2$ are the bias current excitations which are small in magnitude and wherein to prevent rotor oscillation due to the bias current excitations, $\delta_1$ and $\delta_2$ are chosen according to the relation $$\delta_2 = (i^*_{10}/i^*_{20})\delta_1, \; \delta_1 = A\sin(\omega_e t), \; \omega_e < \omega \qquad \text{Eq. 31}$$

wherein A is the amplitude of the bias current excitation, $\omega_e$ is the frequency of the bias current excitation, and $\omega$ is the angular rotation of the rotor. Therefore, the relationship shown by Equation (31) as shown above and in Example 3 is central to the method of the present invention. Equation (31), or other equation that produces a similar effect, enables the induction of variation in the magnetic stiffness of the magnetic field in the bearing without causing rotor oscillation that results from arbitrary variations in the bias current. The significance of the equation is that the bias current excitations for the opposite electromagnetic coils are proportionally related which prevents rotor oscillation due to bias current variation. Therefore, when the bias current excitations are continuously varied over time according to the relationship shown by equation (31) or equivalent, the equilibrium of the rotating rotor is not disturbed.

The persistency of excitation in concert with the adaptation control laws enables the disturbance caused by sensor runout to be distinguished from the disturbance caused by mass unbalance and thus, both disturbances can then be compensated for in a control action for modifying the currents for levitating the rotor. Persistency of excitation through magnetic stiffness variations is the novel element of the present invention and enables any rotor rotating at any constant speed and in any magnetic bearing system to be stabilized about its geometric center. Thus, persistency of excitation can be used in any magnetic bearing system to stabilize the rotor about its geometric center provided the excitations to the bias current to the electromagnetic coils are kept relatively small and proportionally dependent on each other according to a relationship similar to that shown in equation (31). In general, the frequency of excitation is different from that of the rotating rotor and its harmonics to provide a unique frequency or frequencies.

Levitation of the rotor is directed by Equation (33) in Example 3. Equation (33), or other equation for providing a control action, determines the currents that create the magnetic field that levitates the rotor about its geometric center as it is rotating at a constant speed. However, because sensor runout and mass unbalance tend to destabilize the rotor, the control action for any particular moment in time must compensate for sensor runout and mass unbalance at that particular moment in time when determining the current that will drive or maintain the rotor about its geometric center. By continuously compensating for sensor runout and mass unbalance over a period of time after the rotor has attained its constant speed, the rotating rotor is eventually driven to its geometric center. The control action compensates for the sensor runout and mass unbalance determined by the adaptation laws as shown by Eq. (34).

The adaptation laws as exemplified by Equation (34) of Example 3, operates in concert with Equation (31) or equivalent to identify sensor runout and mass unbalance for instantaneous excitation of the bias current and simultaneously provide an estimate of the adaptive parameters which results in an estimate of the geometric center of the rotor. The adaptive parameters are then used to determine a control action, which has compensated for the effect of the sensor runout and mass unbalance for that excitation of the bias current. The above process is repeated for each successive bias current excitation until the rotor is rotating about its geometric center. When the rotor is finally rotating about its geometric center, the error reflective of estimation of sensor runout and mass unbalance have converged to zero and the adaptive parameters have converged to their true values. Thus, the effect of sensor unbalance and mass unbalance have been cancelled and the rotor is rotating about its geometric center. Example 3 provides the mathematical basis for the method of the present invention.

The aforementioned algorithms or equations that comprise the adaptive control framework are adaptable to any controller that is currently being used to control the operation of a magnetic bearing and when appropriately modifiable to include parameters necessary for the operation of complex magnetic bearing systems.

A computer program that controls the operation of a magnetic bearing can be developed that includes the aforementioned algorithms to enable the program to simultaneously identify sensor runout and mass unbalance for a rotor rotating at a constant speed and modify the currents for levitating the rotor to the extent necessary to compensate for the effect of the sensor runout and mass unbalance and further by repeating the identification and modification over time drives and then stabilizes the rotor, which is rotating at the constant speed, about its geometric center. Example 6 provides a computer program for the operation of a magnetic bearing system that has been written that includes the aforementioned algorithms of the present invention.

Therefore, in view of the above, in the operation of a magnetic bearing, the persistency of excitation is the persistent introduction of small bias current excitations in the bias currents to the electromagnetic coils of the magnetic bearing over a period of time. For a first bias current excitation, sensor runout and unbalance can be around zero parameters. The controller uses the adaptation laws in synchrony with the first bias current excitation to determine a disturbance value for the sensor runout and mass unbalance of the rotor for the first excitation in the series. The controller uses the disturbance value determined and determines a control action that compensates for the effect of the disturbance value. The control action then adjusts the currents creating the magnetic field levitating the rotating rotor which compensates for the sensor runout and mass unbalance reflected by the disturbance value thereby driving the rotor to a first position that is closer to its geometric center.

For the second excitation in the series, the controller uses the adaptation laws in synchrony with bias current excitation to redetermine the sensor runout and mass unbalance of the rotor for the second excitation in the series. The disturbances estimated in the second trial is another estimate working towards correct estimation of the disturbances. The controller uses the second disturbance and determines a second control action that compensates for the effect of the second disturbance value. The second control action then adjusts currents creating the magnetic field levitating the rotor to compensate for the sensor runout and mass unbalance reflected by the second disturbance value thereby driving the rotor to a second position that is typically on average closer to its geometric center than the first position.

As this method proceeds over time, the rotor is driven closer and closer to its geometric center until there is no longer a disturbance effect to be compensated for and the rotor is now rotating at its geometric center. When the rotor is at its geometric center, the bias current excitations can be stopped and the rotor will continue to rotate about its geometric center as long as the harmonics of the periodic disturbances remain constant. However, because external disturbances may affect the harmonics of the periodic disturbances, which will cause the rotor to deviate from its geometric center, the method of the present invention must be repeated from time to time either to ensure that the rotor is still at its geometric center or to return the rotor back to its geometric center.

Figure 11:
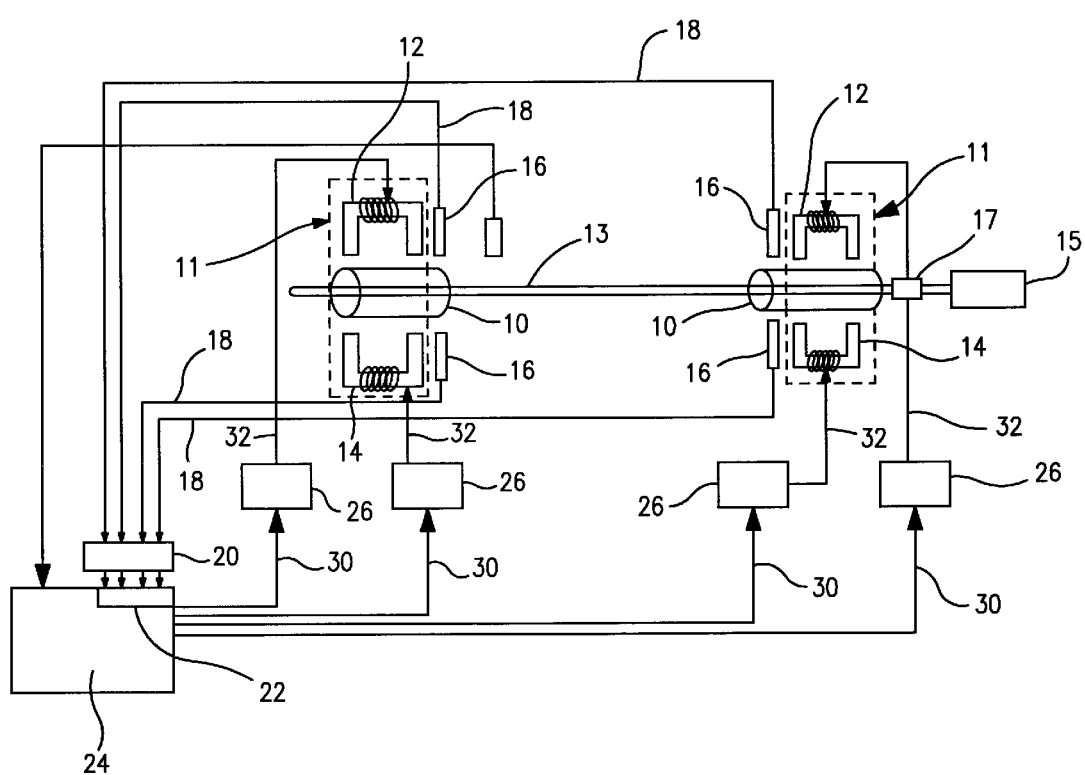
FIG. 11 is a schematic diagram of a magnetic bearing apparatus.

FIG. 11 shows a schematic diagram of a radial magnetic bearing system consisting of two magnetic bearings, which is controlled by the method of the present invention. Shown is rotor sleeve 10 on axle 13 traversing stator 11. Paired in stator 11 are opposed upper electromagnetic coil 12 and lower electromagnetic coil 14. While the diagram shows a single electromagnetic coil pair in each bearing, in general, each magnetic bearing comprises at least two magnetic coil pairs. One electromagnetic coil pair is positioned long an x axis and the other is positioned along a y axis wherein the x and y axes are perpendicular to each other and intersect at the geometric center of the stator 11. In general, the x and y axes are at a 45° angle to the direction of the gravitation force field g. Rotating axle 13 is motor 15 which is connected to axle 13 by means of flexible coupling 17. Typically, adjacent to each electromagnetic coil is position sensor 16. Each position sensor 16 transmits a voltage signal over wire 18 to anti-aliasing filter 20 which removes the high frequency noise. The anti-aliasing filter 20 removes high frequency noise from the voltage signal which can interfere with accurately determining the position of the rotor 10 and can result in noise amplification. After passing through the anti-aliasing filter 10, the voltage signal is converted by the analog to digital converter 22 to a digital form that can be processed by the digital signal processor 24 which comprises a computer program that uses the adaptive compensation algorithms of the present invention, which are the persistency of excitation algorithm as exemplified by equation (31), the adaptation laws algorithm exemplified by equation (34), and the control action algorithm exemplified by equation (33), for determining synchronous sensor runout and mass unbalance and the control action that compensates for the sensor runout and mass unbalance. The digital signal processor 24 then produces an output 30 that is proportional to the amount of bias current necessary to drive or maintain rotor 10 about its geometric center. Simultaneously, digital signal processor 24 also is determining the perturbations of the bias currents that generates persistency of excitation and which causes the continual variation in magnetic stiffness. The output is provided to generators 26 which provides the proper control current 32 to the electromagnetic coils 12 and 14 in response to the output of digital signal processor 24 which simultaneously drives the rotor 10 about its geometric center in stator 11 and generates the persistency of excitation. In general, the sampling and delivery of the current are done at a frequency of 10 to 25 kHz.

The following examples are intended to promote a further understanding of the present invention.

EXAMPLE 1

This example provides the mathematical basis for the method and system of the present invention.

Mathematical Modeling: Sensor Runout and Mass Unbalance

In a magnetically levitated rigid rotor as shown in FIG. 1, there are two degrees of freedom along the x and y axes. The dynamics of the rotor along these axes are similar, but decoupled. Along the x axis, one may write $$m\ddot{x} = F - m\bar{g} + f_u, \quad \bar{g} \triangleq g/\sqrt{2} \qquad \text{Eq. (1)}$$

where m is the rotor mass, x is the position of the rotor geometric center, F is the magnetic force, g is the acceleration due to gravity, and $f_u$ is the mass unbalance force. The magnetic force F can be expressed as (Siegwart, 1992)

$$F = k\left[\left(\frac{i_{10}+I}{l-x}\right)^2 - \left(\frac{i_{20}-I}{l+x}\right)^2\right] \qquad \text{Eq. (2)}$$

where k is the magnetic force constant, l is the nominal air gap, $i_{10}$, $i_{20}$ are the bias currents in the upper and lower electromagnets, and I is the control current. By linearizing Eq. (2) about x=0, I=0, and through proper choice of bias currents, Eq. (1) can be written as $$m\ddot{x} = K_s x + f_c + f_u, \quad f_c \triangleq K_c I, \qquad \text{Eq. (3)}$$

$$K_s \triangleq 2k(i_{10}^2 + i_{20}^2)/l^3, \quad K_c \triangleq 2k(i_{10} + i_{20})/l^2$$

where $f_c$ is the control force, and $K_s$ and $K_c$ are the magnetic stiffness and actuator gain of the magnetic bearing, respectively. The mass unbalance force due to mass eccentricity can be modeled as $$f_u = \epsilon \omega^2 \cos(\omega t + \theta_u) = m\omega^2[p \sin(\omega t) + q \cos(\omega t)] \qquad \text{Eq. (4)}$$

where $$p \triangleq -\epsilon \sin\theta_u, \quad q \triangleq -\epsilon \cos\theta_u,$$

$\theta_u$ is the phase of mass unbalance, $\epsilon$ is the eccentricity of the rotor, and $\omega$ is the rotor angular speed. The true location of the rotor geometric center is not available for a magnetic bearing with synchronous sensor runout. Instead, the gap sensors provide the signal $x_s$ $$x_s = x + d \qquad \text{Eq. (5)}$$

where, d, the synchronous sensor runout disturbance, can be expressed by the Fourier series $$d = a_0 + \sum_{i=1}^{n} a_i \sin(i\omega t) + b_i \cos(i\omega t) \qquad \text{Eq. (6)}$$

In the above expression, n is the number of harmonics, $a_0$ is the DC component, and $a_i$, $b_i$, i=1, 2, . . . ,n, are the harmonic Fourier coefficients.

Manual Sensor Runout Identification

Figure 2:
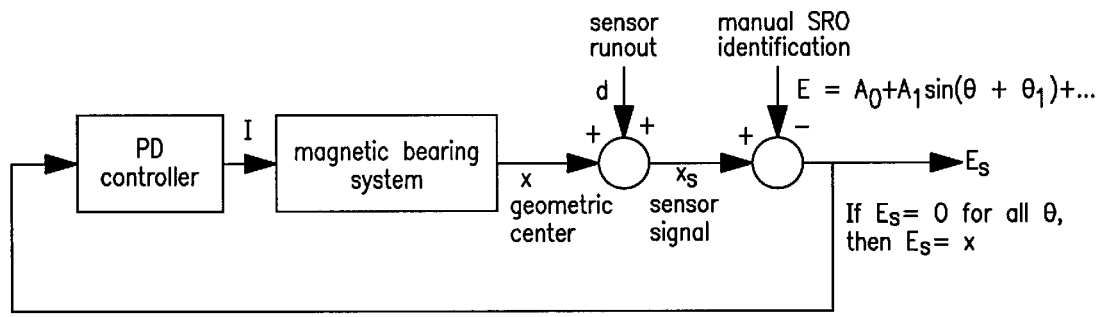
FIG. 2 shows a block diagram of a magnetic synchronous sensor runout identification scheme.

In this section is presented a method for manual identification of synchronous sensor runout. This method is used to verify the performance of the adaptive algorithm. Manual runout identification, which has to be performed separately for each axis of the bearing, requires the rotor to be spun at low speed to avoid the effects of mass unbalance. Therefore, the rotor is first levitated using a proportional plus derivative controller, as shown in FIG. 2. Using a digital signal processor to generate the function $E_0 = A_0$, the feedback loop is closed using the signal $(x_s - E_0)$. The magnitude of $A_0$ is adjusted such that $(x_s - E_0)$ has zero mean. Once this is accomplished, the DC component of runout has been identified. Next, the signal $E_1 = A_1 \sin(\theta + \theta_1)$ is generated, where $$\theta \triangleq \omega t$$

is the rotor angular position obtained from the shaft encoder. $\theta_1$ is selected such that $E_1$ is in phase with the first harmonic of $(x_s - E_0)$. The feedback signal is subsequently changed to $(x_s - E_0 - E_1)$ and $A_1$ is selected by trial and error to eliminate the first harmonic of $(x_s - E_0 - E_1)$. Having identified the first harmonic, the second harmonic $E_2 = A_2 \sin(2\theta + \theta_2)$ is identified, and then higher harmonics, if necessary are identified. The complete runout signal $$E = (E_0 + E_1 + E_2 + \ldots = A_0 + A_1 \sin(\theta + \theta_1) + A_2 \sin(2\theta + \theta_2) + \qquad \text{Eq. (7)}$$

is subtracted from the sensor signal to recover the position of the geometric center, $E_s = x$.

Mass Unbalance Verification Using a Trial Mass

Figure 3:
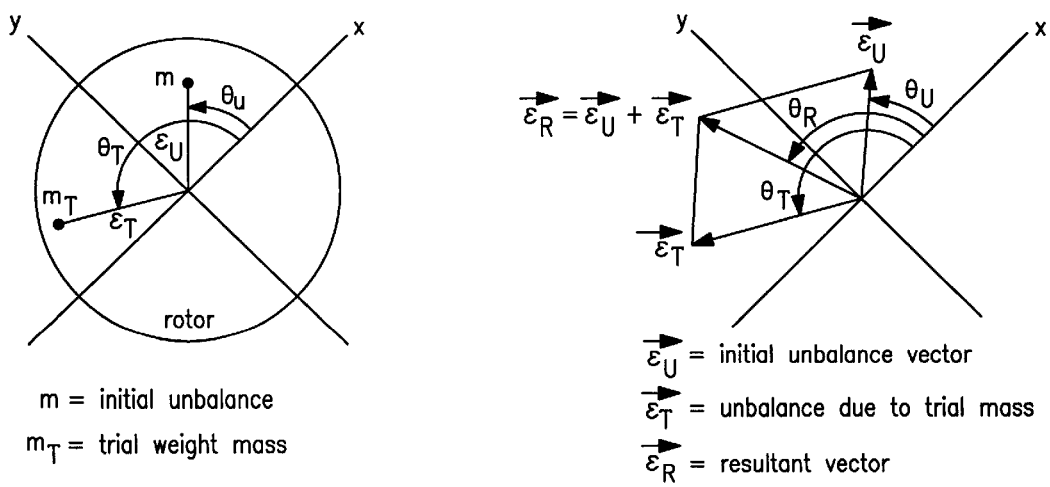
FIG. 3 shows a diagram illustrating mass unbalance verification using trial mass.

In this section is outlined the procedure for verification of rotor mass unbalance estimated by the adaptive algorithm. Let $\epsilon_u$, $\theta_u$ be the estimated magnitude and phase of the initial mass unbalance. Then is added a trial mass $m_T$ to the rotor and re-estimate the mass unbalance using our algorithm. If $\epsilon_T$, $\theta_T$ are the magnitude and phase of the trial mass, we can verify the efficacy of our algorithm if the new mass unbalance vector $\epsilon_R$, $\theta_R$ is a vector sum of the initial mass unbalance and the mass unbalance due to the trial mass. This is explained with the help of FIG. 3.

EXAMPLE 2

This example formulates the problem of rotor stability in a magnetic bearing where the rotor is rotating at a constant speed.

Framework for Adaptive Compensation

Figure 4:
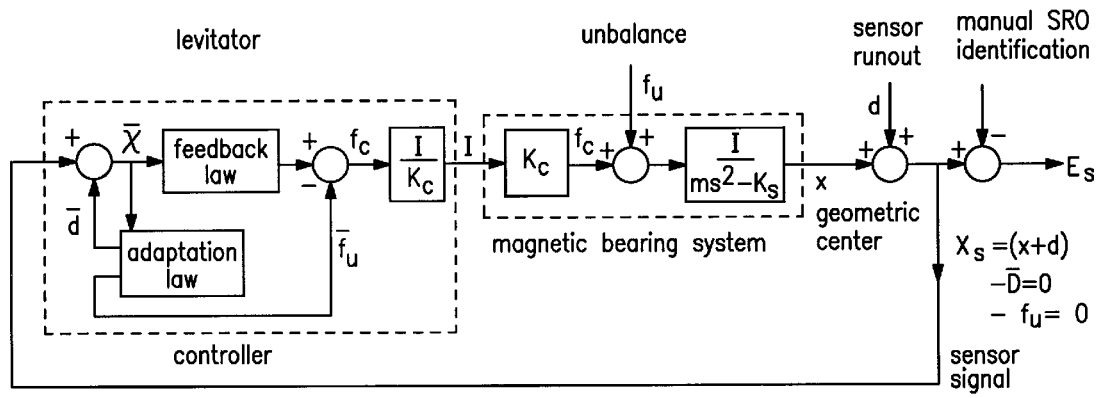
FIG. 4 shows a block diagram illustrating the framework for adaptive compensation of the present invention.
Figure 5A:
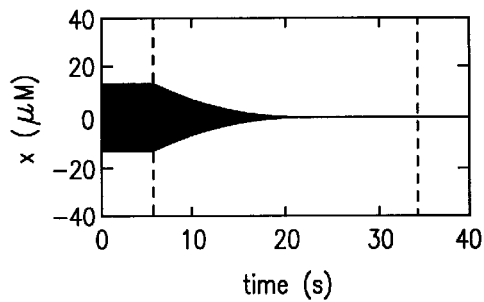
FIG. 5A shows a plot of geometric center over time in a computer simulation.
Figure 5B:
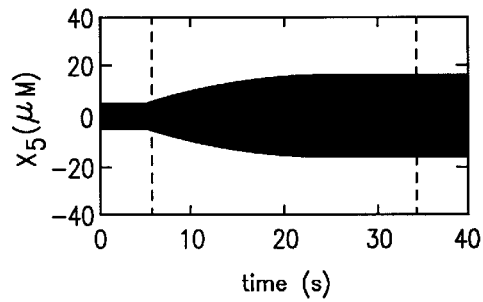
FIG. 5B shows a plot of sensor signal over time in a computer simulation.
Figure 6A:
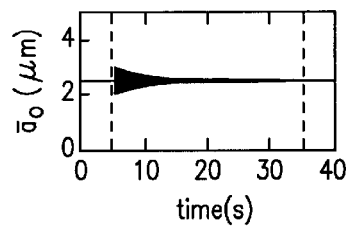
FIG. 6A shows a plot of the estimated Fourier coefficients of synchronous sensor runout and mass unbalance for $\bar{a}_0$. The dotted lines denote the time interval over which the bias currents were excited.
Figure 6B:
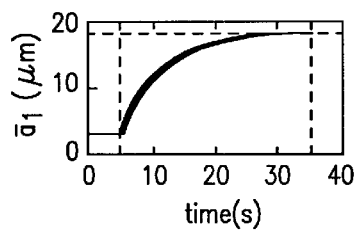
FIG. 6B shows a plot of the estimated Fourier coefficients of synchronous sensor runout and mass unbalance for $\bar{a}_1$. The dotted lines denote the time interval over which the bias currents were excited. The true value is shown by the dashed line.
Figure 6C:
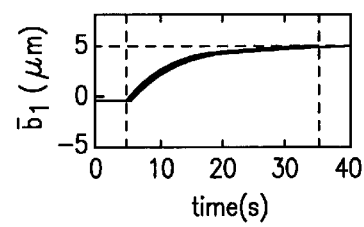
FIG. 6C shows a plot of the estimated Fourier coefficients of synchronous sensor runout and mass unbalance for $\bar{b}_1$. The dotted lines denote the time interval over which the bias currents were excited. The true value is shown by the dashed line.
Figure 6D:
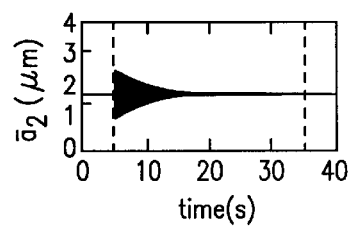
FIG. 6D shows a plot of the estimated Fourier coefficients of synchronous sensor runout and mass unbalance for $\bar{a}_2$. The dotted lines denote the time interval over which the bias currents were excited.
Figure 6E:
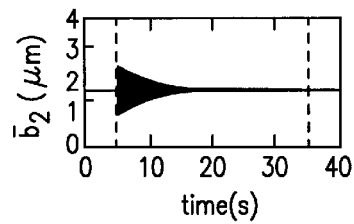
FIG. 6E shows a plot of the estimated Fourier coefficients of synchronous sensor runout and mass unbalance for $\bar{b}_2$. The dotted lines denote the time interval over which the bias currents were excited. The true value is shown by the dashed line.
Figure 6F:
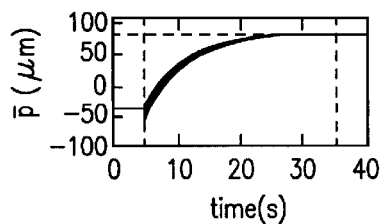
FIG. 6F shows a plot of the estimated Fourier coefficients of synchronous sensor runout and mass unbalance for $\bar{p}$. The dotted lines denote the time interval over which the bias currents were excited. The true value is shown by the dashed line.
Figure 6G:
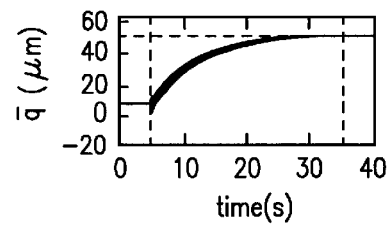
FIG. 6G shows a plot of the estimated Fourier coefficients of synchronous sensor runout and mass unbalance for $\bar{q}$. The dotted lines denote the time interval over which the bias currents were excited. The true value is shown by the dashed line.
Figure 10A:
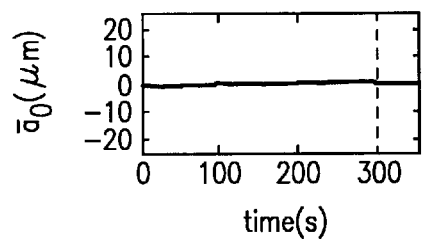
FIG. 10A is a plot showing a time trace of estimated Fourier coefficients of synchronous sensor runout and mass unbalance for $\bar{a}_0$.
Figure 10B:
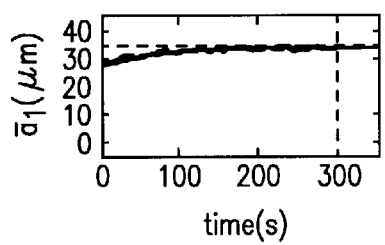
FIG. 10B is a plot showing a time trace of estimated Fourier coefficients of synchronous sensor runout and mass unbalance for $\bar{a}_1$. The dashed line denotes steady state values.
Figure 10C:
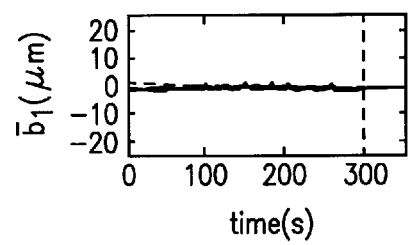
FIG. 10C is a plot showing a time trace of estimated Fourier coefficients of synchronous sensor runout and mass unbalance for $\bar{b}_1$. The dashed line denotes steady state values.
Figure 10D:
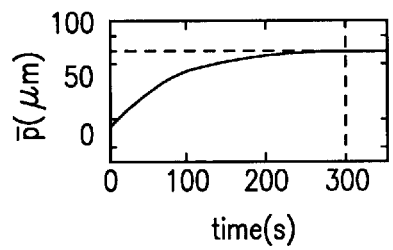
FIG. 10D is a plot showing a time trace of estimated Fourier coefficients of synchronous sensor runout and mass unbalance for $\bar{p}$. The dashed line denotes steady state values.
Figure 10E:
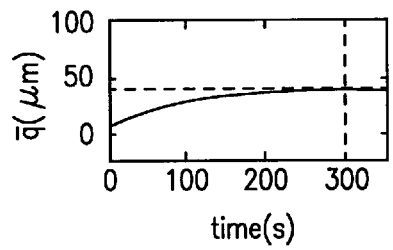
FIG. 10E is a plot showing a time trace of estimated Fourier coefficients of synchronous sensor runout and mass unbalance for $\bar{q}$. The dashed line denotes steady state values.

An adaptive control framework for rotor stabilization through compensation of both mass unbalance and synchronous sensor runout is adopted. The adaptive controller, shown in FIG. 4, is comprised of a feedback law for geometric center stabilization and adaptation laws for individual cancellation of the synchronous periodic disturbance. The controller is an on-line feedforward type consisting of the feedback law to stabilize the closed loop system and the adaptation law to estimate the two periodic disturbances, synchronous sensor runout and mass unbalance, simultaneously. For the purpose of feedback, the geometric center is estimated as $$\bar{x} = x_s - \bar{d} \qquad \text{Eq. (8)}$$

where $\bar{d}$ is the estimated runout, given by the relation $$\bar{d} = \bar{a}_0 + \sum_{i=1}^{n} \bar{a}_i \sin(i\omega t) + \bar{b}_i \cos(i\omega t) \qquad \text{Eq. (9)}$$

In the above expression, $\bar{a}_0$ is the estimated value of $a_0$, and $\bar{a}_i$, $\bar{b}_i$, are estimated values of $a_i$, $b_i$, respectively, for i=1, 2, . . . , n. Using Eqs. (5), (6), (8), and (9), the estimated geometric center can be expressed as $$\bar{x} = x + \tilde{d}, \quad \tilde{d} \triangleq (d - \bar{d}) \triangleq Y^T \tilde{\phi} \qquad \text{Eq. (10)}$$

where d is the error in the estimated value of runout, and Y and $\phi$ are the regressor vector and the vector of Fourier coefficient estimation errors, defined as $$Y \triangleq [1 \; \sin(\omega t) \cos(\omega t) \sin(2\omega t) \cos(2\omega t) \ldots \sin(\eta \omega t) \cos(\eta \omega t)]^T \qquad \text{Eq. (11)}$$

$$\tilde{\phi} \triangleq [\tilde{a}_0 \; \tilde{\phi}_\alpha^T \; \tilde{\phi}_\beta^T]^T, \; \tilde{\phi}_\alpha \triangleq [\tilde{a}_1 \; \tilde{b}_1]^T, \; \tilde{\phi}_\beta \triangleq [\tilde{a}_2 \; \tilde{b}_2 \ldots \tilde{a}_n \; \tilde{b}_n]^T$$

The estimation errors in the above expression are given by the relations $$\tilde{a}_0 \triangleq (a_0 - \bar{a}_0), \; \tilde{a}_i \triangleq (a_i - \bar{a}_i), \; \tilde{b}_i \triangleq (b_i - \bar{b}_i), \; i = 1, 2, \ldots n.$$

If these errors are converged to zero, the estimated geometric center x will converge to the true geometric center, x.

For compensation, the mass unbalance force in Eq. (4) is estimated as $$\bar{f}_u = -Y_u^T \bar{\phi}_u, \; Y_u \triangleq -m\omega^2 [\sin(\omega t) \cos(\omega t)]^T, \; \bar{\phi}_u \triangleq ([\bar{p} \; \bar{q}])^T \qquad \text{Eq. (12)}$$

where $\bar{p}$, $\bar{q}$, are estimates of the Fourier coefficients p, q, respectively. If errors in these estimates are defined as $$\tilde{p} \triangleq (p - \bar{p}), \; \tilde{q} \triangleq (q - \bar{q}),$$

the net mass unbalance force acting on the rotor is $$f_u - \bar{f}_u = -Y_u^T \tilde{\phi}_u, \; \tilde{\phi}_u \triangleq [\tilde{p} \; \tilde{q}]^T \qquad \text{Eq. (13)}$$

If the errors in the estimates of the mass unbalance Fourier coefficients $\tilde{p}$, $\tilde{q}$ are converged to zero, the mass unbalance force will be cancelled through feedforward compensation, in accordance with FIG. 4.

Multiple Angular Speed Approach

In this section is reviewed the multiple angular speed approach for synchronous disturbance identification, as proposed by Setiawan et al. (1999a). This discussion provides background and motivation for bias current excitation as the means for synchronous disturbance compensation, which is presented in the next section. With the objective of stabilizing the rotor geometric center through individual identification and cancellation of synchronous sensor runout and mass unbalance, we provide the control action $$f_c = -[K_s \bar{x} + m\lambda \dot{\bar{x}} + c\bar{e} + m\omega^2 \{\bar{p}\sin(\omega t) + \bar{q}\cos(\omega t)\}] \quad \text{Eq. (14)}$$

along with the adaptation laws $$\dot{\tilde{\phi}} = \Gamma Y_m \bar{e}, \quad \dot{\tilde{\phi}} = \Gamma_u Y_u \bar{e} \quad \text{Eq. (15)}$$

In Eqs. (14) and (15), $\bar{e}$ is the weighted sum of the estimated position and velocity of the rotor geometric center, defined as $$\bar{e} \triangleq \dot{\bar{x}} + \lambda \bar{x} \quad \text{Eq. (16)}$$

where $\lambda$ is a positive constant, $\Gamma \in R^{(2n+1) \times (2n+1)}$ and $\Gamma_u \in R^{2 \times 2}$ are positive definite constant adaptation gain matrices, given by the relations $$\Gamma \triangleq diag(\gamma_0, \gamma_1, \gamma_1, \gamma_2, \gamma_2, \ldots, \gamma_n, \gamma_n), \quad \Gamma_u \triangleq diag(\gamma_p, \gamma_q)$$

and $Y_m$ is the derived regressor vector $$Y_m \triangleq K_s Y - m\ddot{Y} \quad \text{Eq. (17)}$$

Furthermore, in Eq. (15), the synchronous sensor runout adaptation gains, $\nu_i$, i=0, 1, 2, ..., n, are chosen such that the time-invariant constant $\Delta$, defined below, satisfies $0 < \Delta < 1$.

$$\Delta \triangleq Y^T \Gamma Y_m = \sum_{i=0}^{n} \gamma_i (K_s + mi^2 \omega^2) \quad \text{Eq. (18)}$$

The dynamic behavior of the closed-loop system is obtained by substituting Eq. (14) into Eq. (3), and simplifying using Eqs. (10) and (13)

$$m\ddot{x} = -K_s Y^T \tilde{\phi} - m\lambda \dot{\bar{x}} - c\bar{e} - Y_u^T \tilde{\phi}_u$$

Using the relations $$\ddot{\bar{x}} = \ddot{x} + \ddot{\bar{d}}$$

from Eq. (10) and $e = x + \lambda x$ from Eq.(16), this can be rewritten as $$m\dot{\bar{e}} = m\ddot{\bar{d}} - K_s Y^T \tilde{\phi} - c\bar{e} - Y_u^T \tilde{\phi}_u \quad \text{Eq. (19)}$$

To simplify further, we examine the expression for $$\ddot{\bar{d}}$$

from Eq. (10) and substitute Eq. (15) therein $$\ddot{\bar{d}} = \ddot{Y}^T \tilde{\phi} + 2\dot{Y}^T \dot{\tilde{\phi}} + Y^T \ddot{\tilde{\phi}} \quad \text{Eq. (20)}$$
$$= \ddot{Y}^T \tilde{\phi} + 2\dot{Y}^T \Gamma Y_m \bar{e} + Y^T \Gamma \dot{Y}_m \bar{e} + Y^T \Gamma Y_m \dot{\bar{e}}$$

Using Eq. (18), and the identities $\dot{Y}^T \Gamma Y_m = \dot{Y}^T \Gamma Y_m = 0$ which can be established from Eqs.(11) and (17), Eq.(20) can be expressed as $$\ddot{\bar{d}} = \ddot{Y}^T \tilde{\phi} + \Delta \dot{\bar{e}}.$$

Substitution of this relation in Eq. (19) and restatement of the adaptation laws in Eq. (15), results in the closed-loop system dynamics $$m(1-\Delta)\dot{\bar{e}} = -Y_m^T \tilde{\phi} - c\bar{e} - Y_u^T \tilde{\phi}_u, \quad 0 < \Delta < 1 \quad \text{Eq. (21a)}$$

$$\dot{\tilde{\phi}} = \Gamma Y_m \bar{e} \quad \text{Eq. (21b)}$$

$$\dot{\tilde{\phi}}_u = \Gamma_u Y_u \bar{e} \quad \text{Eq. (21c)}$$

with $(\bar{e}, \tilde{\phi}, \tilde{\phi}_u) = (0,0,0)$ as an equilibrium. Indeed, it can be verified from Eq. (21) that $(\bar{e}, \tilde{\phi}, \tilde{\phi}_u) = (0,0,0)$ implies $$(\dot{\bar{e}}, \dot{\tilde{\phi}}, \dot{\tilde{\phi}}_u) = (0, 0, 0).$$

To study the stability of the equilibrium, we define the Lyapunov function candidate $$V(\bar{e}, \tilde{\phi}, \tilde{\phi}_u) = \frac{1}{2}[(1-\Delta)m\bar{e}^2 + \tilde{\phi}^T \Gamma^{-1} \tilde{\phi} + \tilde{\phi}_u^T \Gamma_u^{-1} \tilde{\phi}_u] \quad \text{Eq. (22)}$$

which is positive definite since $\Gamma$ and $\Gamma_u$ are positive definite matrices and $\Delta$ satisfies $0 < \Delta < 1$. Furthermore, V is continuously differentiable and its derivative along the system trajectories in Eq. (21) is given by the relation $$\dot{V} = m(1-\Delta)\bar{e}\dot{\bar{e}} + \tilde{\phi}^T \Gamma^{-1} \dot{\tilde{\phi}} + \tilde{\phi}_u^T \Gamma_u^{-1} \dot{\tilde{\phi}}_u = -c\bar{e}^2 \leq 0$$

Since $\dot{V}$ is negative semi-definite, $(\bar{e}, \tilde{\phi}, \tilde{\phi}_u, t) = (0,0,0)$ is a stable equilibrium. In addition, since $\dot{V}$ is uniformly continuous, we deduce from Barbalat's lemma (Khalil, 1996) that $\dot{V} \to 0$ as $t \to \infty$. This implies $e \to 0$ as $t \to \infty$. By differentiating Eq.(21a), we can show $$\ddot{\bar{e}} = \ddot{\bar{e}}(\bar{e}, \tilde{\phi}, \tilde{\phi}_u, t)$$

is bounded. This implies that e is uniformly continuous. Since $\bar{e} \to 0$ as $t \to \infty$, we use Barbalat's lemma (Khalil, 1996) to deduce $$\dot{\bar{e}} \to 0 \text{ as } t \to \infty.$$

From Eq. (21a) we now claim $$(Y_m^T \tilde{\phi} + Y_u^T \tilde{\phi}_u) \to 0 \quad \text{Eq. (23)}$$

Using the orthogonality property of the harmonic components, we separate $Y_m$ into $Y_\alpha \in R^2$ and $Y_E \in R^{(2n-1)}$, and rewrite Eq. (23) as $$(Y_\alpha^T \phi_\alpha + Y_u^T \phi_u) \to 0 \qquad \text{Eq. (24a)}$$

$$Y_E \phi_E \to 0 \qquad \text{Eq. 24(b)}$$

$$Y_\alpha \triangleq (K_s + m\omega^2)[\sin(\omega t)\ \cos(\omega t)]^T \qquad \text{Eq. (25)}$$

$$Y_E \triangleq (K_s\ Y_\beta^T)^T$$

$$\tilde{\phi}_E \triangleq [\tilde{a}_0\ \tilde{\phi}_\beta^T]^T$$

$$Y_\beta \triangleq \begin{bmatrix} [K_s + m(2\omega)^2]\sin(2\omega t) \\ [K_s + m(2\omega)^2]\cos(2\omega t) \\ \vdots \\ [K_s + m(2\omega)^2]\sin(n\omega t) \\ [K_s + m(2\omega)^2]\cos(n\omega t) \end{bmatrix}^T$$

where $\phi_\alpha$, $\phi_\beta$ have been defined earlier in Eq. (11). It can be shown that there are some positive constants $\alpha_1$, $\alpha_2$ and $T_0$, such that $$\alpha_2 I \geq \int_t^{t+T_0} Y_E Y_E^T d\tau \geq \alpha_1 I$$

where I is the identity matrix of dimension (2n−1) Therefore $Y_E$ is a persistently exciting signal (Khalil, 1996). This implies from Eq. (24b) that $\phi_E \to 0$ as $t \to \infty$. From the definition of $\phi_\beta$ and $\phi_E$ in Eqs. (11) and (25) we conclude that the estimated values of all harmonics of synchronous sensor runout, except the first, converge to their true values, i.e. $\tilde{a}_0 \to 0$ and $\tilde{a}_i, \tilde{b}_i \to 0$ for i=2, 3, ..., n. The estimated values of harmonic mass unbalance and the first harmonics of runout, however, do not converge to their true values. This is evident from the following equations $$\begin{aligned}\tilde{a}_1 - \mu \tilde{p} = 0 \\ \tilde{b}_1 - \mu \tilde{q} = 0\end{aligned} \Rightarrow \begin{aligned}(a_1 - \bar{a}_1) - \mu(p - \bar{p}) = 0 \\ (b_1 - \bar{b}_1) - \mu(q - \bar{q}) = 0\end{aligned} \quad \mu(\omega) \triangleq \frac{m\omega^2}{K_s + m\omega^2} \qquad \text{Eq. (26)}$$

which can be obtained from Eq. (24a) using Eqs. (11), (12), and (25). To converge both $\phi_\alpha$ and $\phi_u$ in Eq. (24a) to zero, we need to distinguish between the harmonics of mass unbalance and the first harmonics of runout. To this end, Setiawan, et al. (1999a) proposed that the rotor speed be switched between two different values, which effectively generates two sets of Eq. (26) corresponding to two distinct values of $\mu(\omega)$. These four equations can be used to individually identify the four unknowns $a_1$, $b_1$, $p$, and $q$. The estimates of harmonic mass unbalance, $a_1$, $b_1$, and first harmonics of runout, p, q, can be subsequently converged to their true values using innocuous modification of the adaptation laws in Eq. (15). Subsequent analysis of the closed-loop system can establish asymptotic stability of the rotor geometric center about the origin. Similar analysis is presented in Example 3 and is, therefore, skipped here.

In implementation, the multiple angular speed approach suffers from two main drawbacks. First, numerical computation of $a_1$, $b_1$, $p$, $q$, using Eq. (26), is very sensitive to the value of $\mu$. Since uncertainty in the values of m, $K_s$, and $\omega$ result in large errors in calculating $\mu$, it is difficult to identify the correct values of $a_1$, $b_1$, p, and q. Second, the approach requires rotor operation at two sufficiently well separated operating speeds in order that the four algebraic equations are well-conditioned. In many applications, speed variation may not be desirable, or even permitted. In such cases the above approach cannot be used.

EXAMPLE 3

This example provides the mathematical basis and the algorithms used in the adaptive compensation using bias current excitation method of the present invention.

Persistant Excitation Through Variation of Magnetic Stiffness

From the discussion in the last section it is clear that an attempt to identify both mass unbalance and runout at constant rotor speed results in Eq.(23), which can be written as $$(Y_m^T \tilde{\phi} + Y_u^T \tilde{\phi}_u) = \qquad \text{Eq. (27)}$$

$$Y_{mu}^T \begin{pmatrix} \tilde{\phi} \\ \tilde{\phi}_u \end{pmatrix} \to 0 \quad Y_{mu} \triangleq \begin{pmatrix} K_s \\ [K_s + m\omega^2]\sin(\omega t) \\ [K_s + m\omega^2]\cos(\omega t) \\ \vdots \\ [K_s + m(n\omega)^2]\sin(\omega t) \\ [K_s + m(n\omega)^2]\cos(\omega t) \\ -m\omega^2 \sin(\omega t) \\ -m\omega^2 \cos(\omega t) \end{pmatrix} \in R^{(2n+3)}$$

In the above equation, $Y_{mu}$ is composed of n frequency components and a DC term, and as such fails to satisfy the persistent excitation condition (Khalil, 1996). To overcome this problem, we vary magnetic stiffness of the bearing, $K_s$, through sinusoidal excitation of bias currents. In the appendix we show that bias current excitation at an appropriate frequency can indeed guarantee persistency of excitation. In this section we discuss the procedure for bias current variation in the opposite coils.

The bias currents in opposite coils are nominally chosen to provide the force that cancels the weight of the rotor when the rotor is geometrically centered. Therefore, the bias currents nominally satisfy $$k(i_{10}^2 - i_{20}^2) = m\bar{g}l^2 \qquad \text{Eq. (28)}$$

For the excitation algorithm, small excitations $\delta_1$, $\delta_2$, in the bias currents of the top and bottom coils are according to the relations $$i_{10} = i_{10}^* + \delta_1,\ i_{20} = u_{20}^* + \delta_2 \qquad \text{Eq. (29)}$$

where $i^*_{10}$ and $i^*_{20}$ are constants, and $\delta^2_1$, $\delta^2_2 \approx 0$. Substitution of Eq. (29) into Eq. (28) yields $$k[(i^*_{10})^2 - (i^*_{20})^2] + 2k(i_{10}^* \delta_1 - i_{20}^* \delta_2) = m\bar{g}l^2 \qquad \text{Eq. (30)}$$

In order to prevent rotor oscillation due to bias current variation, we choose $\delta_1$ and $\delta_2$ according to the relation $$\delta_2 = (i^*_{10}/i^*_{20})\delta_1,\ \delta_1 = A\sin(\omega_e t),\ \omega_e < \omega \qquad \text{Eq. (31)}$$

where A, $\omega_e$, are the amplitude and frequency of bias current excitation. Indeed, substitution of the above equation into Eq. (30) indicates that rotor equilibrium is maintained for $i_{10}=i^*_{10}$ and $i_{20}=i^*_{20}$. When $\delta_1$ and $\delta_2$ satisfy Eq. (31), the magnetic stiffness and actuator gain of the bearing are given by the expressions $$K_s = K_s^* + \frac{8k}{l^3} i^*_{10}\delta_1 \qquad K_s^* \triangleq \frac{2k}{l^3}[(i^*_{10})^2 + (i^*_{20})^2] \qquad \text{Eq. (32)}$$

$$K_c = K_c^* + \frac{2k}{l^2}(1 + i^*_{10}/i^*_{20})\delta_1 \qquad K_c^* \triangleq \frac{2k}{l^2}[i^*_{10} + i^*_{20}]$$

where $K^*_s$ and $K^*_c$ are constants. In the sequel, $K_s$ and $K_c$ are treated as variables.

In order to individually identify and compensate the synchronous disturbances due to synchronous sensor runout and mass unbalance using bias current excitation, and stabilize the rotor geometric center to the origin, the adaptive algorithm determines the control action $$f_c = -\left[K_s\bar{x} + m\lambda\dot{\bar{x}} + \left(c + \frac{1}{2}m\Delta\right)\bar{e} + m\omega^2\{\bar{p}\sin(\omega t) + \bar{q}\cos(\omega t)\}\right] \qquad \text{Eq. (33)}$$

The above control action is very similar to the one proposed in Eq.(14), except for the additional term involving $\dot{\Delta}$. Although $\Delta$ was defined as a constant in Eq. (18), it varies when bias currents are excited. The expression for $\dot{\Delta}$ can be obtained using Eqs. (18), (31) and (32) as follows $$\dot{\Delta} = \dot{K}_s \sum_{i=1}^{n} \gamma_i = \frac{8\omega_e k}{l^3} A\cos(\omega_e t)i^*_{10}\sum_{i=1}^{n}\gamma_i$$

Along with the control action in Eq. (33), are the adaptation laws $$\dot{\tilde{\phi}} = \Gamma Y_m \bar{e}, \quad \dot{\tilde{\phi}}_u = \Gamma_u Y_u \bar{e} \qquad \text{Eq. (34)}$$

which are exactly the same as in Eq.(15).

The dynamics of the rotor is obtained by substituting Eq. (33) into Eq. (3), and simplifying using Eqs. (10) and (13)

$$m\ddot{x} = -K_s Y^T \tilde{\phi} - m\lambda\dot{\bar{x}} - c\bar{e} - (1/2)m\Delta\bar{e} - Y_u^T \tilde{\phi}_u \qquad \text{Eq. (35)}$$

Using the relations $$\ddot{x} = \dot{\bar{x}} + \ddot{\bar{d}}$$

from Eq. (10) and $$\dot{\bar{e}} = \ddot{\bar{x}} + \lambda\dot{\bar{x}}$$

from Eq. (16), Eq. (35) can be rewritten as $$m\dot{\bar{e}} = m\ddot{\bar{d}} - K_s Y^T \tilde{\phi} - c\bar{e} - (1/2)m\Delta\bar{e} - Y_u^T \tilde{\phi}_u \qquad \text{Eq. (36)}$$

To simplify, we examine the expression for $$\ddot{\bar{d}}$$

from Eq. (20). Using Eq. (18), and the identity $\dot{Y}^T \Gamma Y_m = 0$ which can be established from Eqs. (11) and (17), we can rewrite Eq. (20) as $$\ddot{\bar{d}} = \dot{Y}^T \tilde{\phi} + \Delta\bar{e} + \Delta\dot{\bar{e}} \qquad \text{Eq. (37)}$$

Substitution of Eq. (37) in Eq. (36), and restatement of Eqs. (16) and (34) provides the following closed-loop system dynamics $$\dot{\bar{x}} = -\lambda\bar{x} + \bar{e} \qquad \text{Eq. (38a)}$$

$$m(1-\Delta)\dot{\bar{e}} = -[c - (1/2)m\Delta]\bar{e} - Y_m^T\tilde{\phi} - Y_u^T\tilde{\phi}_u \qquad \text{Eq. (38b)}$$

$$\dot{\tilde{\phi}} = \Gamma Y_m \bar{e} \qquad \text{Eq. (38c)}$$

$$\dot{\tilde{\phi}}_u = \Gamma_u Y_u \bar{e} \qquad \text{Eq. (38d)}$$

The following observations can now be made with respect to the closed-loop system.

Theorem 1

Consider the sub-system described by Eqs. (38b), (38c), and (38d). For this sub-system, the equilibrium ($\bar{e}$, $\tilde{\phi}$, $\tilde{\phi}_u$)=(0,0,0) is asymptotically stable.

Proof of Theorem 1. From Eqs. (38b), (38c) and (38d) first notice that ($\bar{e}$, $\tilde{\phi}$, $\tilde{\phi}_u$)=(0,0,0) implies $$(\dot{\bar{e}}, \dot{\tilde{\phi}}, \dot{\tilde{\phi}}_u) = (0, 0, 0).$$

Therefore, ($\bar{e}$, $\tilde{\phi}$, $\tilde{\phi}_u$)=(0,0,0) is an equilibrium point. To show that this equilibrium is asymptotically stable, we consider the Lyapunov function candidate in Eq. (22)

$$V(\bar{e}, \tilde{\phi}, \tilde{\phi}_u) = \frac{1}{2}\left[(1-\Delta)m\bar{e}^2 + \tilde{\phi}^T\Gamma^{-1}\tilde{\phi} + \tilde{\phi}_u^T\Gamma_u^{-1}\tilde{\phi}_u\right]$$

The derivative of V along the system trajectories in Eq. (38) is given by the relation $$\dot{V} = m(1-\Delta)\bar{e}\dot{\bar{e}} - \frac{1}{2}m\Delta\bar{e}^2 + \tilde{\phi}^T\Gamma^{-1}\dot{\tilde{\phi}} + \tilde{\phi}_u^T\Gamma_u^{-1}\dot{\tilde{\phi}}_u = -c\bar{e}^2 \leq 0$$

Since $\dot{V}$ is negative semi-definite, ($\bar{e}$, $\tilde{\phi}$, $\tilde{\phi}_u$)=(0,0,0) is stable. In addition, since V is uniformly continuous, we can use Barbalat's lemma {Khalil, 1996) to claim $\dot{V} \to 0$ as $t \to \infty$. This implies $\bar{e} \to 0$ as $t \to \infty$. By differentiating Eq.(38b), we can show that $$\ddot{\bar{e}} = \ddot{\bar{e}}(t, \bar{e}, \tilde{\phi}, \tilde{\phi}_u)$$

is bounded. This implies that e is uniformly continuous. Since e→0 as t→∞, we again use Barbalat's lemma (Khalil, 1996) to deduce $$\dot{\bar{e}} \to 0 \text{ as } t \to \infty.$$

Knowing $\bar{e}$, $$\dot{\bar{e}} \to 0 \text{ as } t \to \infty,$$

we conclude from Eq.(38b)

$$(Y_m^T \tilde{\phi} + Y_u^T \tilde{\phi}_u) = Y_{mu}^T \begin{pmatrix} \tilde{\phi} \\ \tilde{\phi}_u \end{pmatrix} \to 0 \qquad \text{Eq. (39)}$$

In the appendix we have shown that $Y_{mu}$ is persistently exciting (Khalil, 1996) under sinusoidal bias current excitation, for a range of excitation frequency. Therefore, for an appropriate choice of excitation frequency, we can claim $\phi, \phi_u \to 0$ as $t \to \infty$. This concludes proof of theorem 1.

Lemma 1

The origin of the closed-loop system in Eq. (38), $(\bar{x}, \bar{e}, \phi, \phi_u) = (0,0,0,0)$, is an asymptotically stable equilibrium point.

Proof of Lemma 1. The closed loop system in Eq. (38) is an interconnected system of the form $$\dot{z}_1 = f_1(t, z_1, z_2) \qquad \text{Eq. (40a)}$$

$$\dot{z}_2 = f_2(t, z_2) \qquad \text{Eq. (40b)}$$

where $$Z_1 \overset{\Delta}{=} \bar{x}, \text{ and } Z_2 \overset{\Delta}{=} \left(\bar{e}\tilde{\phi}^T, \tilde{\phi}_u^T\right)^T$$

are the state variables of the two sub-systems. From Theorem 1 we know that $Z_2=0$ is an asymptotically stable equilibrium of the sub-system in Eq. (40b). Also, $\dot{Z}_1 = f(t, Z_1, 0)$ has an asymptotically stable equilibrium point at $Z_1=0$. This can be established from Eqs. (38a) and (40a). Using the asymptotic stability theorem for cascaded systems (Khalil, 1996), we conclude $(\bar{x}, \bar{e}, \phi, \phi_u) = (0,0,0,0)$, is an asymptotically stable equilibrium. This concludes proof of Lemma 1.

Theorem 2

The coordinate $(x, \dot{x}, \phi, \phi_u)$ $(0,0,0,0)$ is an asymptotically stable equilibrium point for the closed loop system defined by Eqs. (3), (4), (33) and (34).

Proof of Theorem 2. Using Eqs.(10), (18), (38a), and (38c), we find that at $(x, \dot{x}, \phi, \phi_u) = (0,0,0,0)$, we have $$\tilde{d} = Y^T \tilde{\phi} = 0, \quad \bar{x} = x + \tilde{d} = 0,$$

$$\dot{\tilde{d}} = \left(\dot{Y}^T \tilde{\phi} + Y^T \dot{\tilde{\phi}}\right) = Y^T \Gamma Y_m \bar{e} = \Delta \bar{e} = \Delta(\dot{\bar{x}} + \lambda \bar{x}) = \Delta \dot{\bar{x}}$$

Also, at $(x, \dot{x}, \phi, \phi_u) = (0,0,0,0)$, $$\dot{\tilde{d}} = (\dot{\bar{x}} - \dot{x}) = \dot{\bar{x}}.$$

Comparing with the expression for $$\dot{\tilde{d}}$$

above, we have $$\dot{\tilde{d}} = \bar{e} = \dot{\bar{x}} = 0,$$

since $\Delta \neq 1$. From Eqs.(34) and (35), it follows that $$\left(\dot{x}, \ddot{x}, \dot{\tilde{\phi}}, \dot{\tilde{\phi}}_u\right) = (0, 0, 0, 0).$$

Therefore, $(x, \dot{x}, \phi, \phi_u) = (0,0,0,0)$ is an equilibrium point. The fact that $(x, \dot{x}, \phi, \phi_u) = (0,0,0,0)$ is asymptotically stable can now be deduced from (a) $(\bar{x}, \bar{e}, \phi, \phi_u) = (0,0,0,0)$ is an asymptotically stable equilibrium (follows from Lemma 1), (b) the transformation matrix P that maps $(\bar{x}, \bar{e}, \phi, \phi_u)$ to $(x, \dot{x}, \phi, \phi_u)$ $$P \overset{\Delta}{=} \begin{pmatrix} 1 & 0 & -Y^T & 0 \\ -\lambda & (1-\Delta) & -\dot{Y}^T & 0 \\ 0 & 0 & E_{(2n+1)} & 0 \\ 0 & 0 & 0 & E_2 \end{pmatrix}$$

where $E_{(2n+1)}$, $E_2$ are identity matrices of dimension $(2n+1)$ and 2, respectively, is well defined and upper bounded, and (c) the inverse transformation $P^{-1}$ exists, and $\|P^{-1}\|$ is also upper bounded. This concludes proof of theorem 2.

Theorem 2 establishes that the adaptive controller, in conjunction with sinusoidal excitation of the bias currents, guarantees geometric center stabilization of the rotor through identification and cancellation of synchronous runout and mass unbalance.

Persistent Excitation. Under bias current excitation, the stiffness of the magnetic bearing varies according to the relation $$K_s = K_s^* + \zeta \sin(\omega_e t), \zeta \overset{\Delta}{=} 8k i_{10}^* A / l^3 \qquad \text{Eq. (A-1)}$$

This follows from Eqs. (31 and 32). Substituting the above expression in Eq. (27), we compute matrix Q, defined as follows $$Q = \frac{1}{T_0} \int_t^{t+T_0} Y_{mu} Y_{mu}^T d\tau$$

By choosing $T_0$ as the least common multiple of the time periods of rotation and excitation, and $\omega_e$ in the range $0 < \omega_e < \omega$, $\omega_e \neq \omega/2$, we find that $Q \in R^{(2n+3) \times (2n+3)}$ has the structure $$Q \triangleq \frac{1}{2} \begin{pmatrix} 2\sigma_0 & 0 & 0 & 0 & 0 & \cdots & 0 & 0 & 0 & 0 & 0 & 0 \\ 0 & \sigma_1 & 0 & 0 & 0 & \cdots & 0 & 0 & 0 & 0 & C_1 & 0 \\ 0 & 0 & \sigma_1 & 0 & 0 & \cdots & 0 & 0 & 0 & 0 & 0 & C_1 \\ 0 & 0 & 0 & \sigma_2 & 0 & \cdots & 0 & 0 & 0 & 0 & 0 & 0 \\ 0 & 0 & 0 & 0 & \sigma_2 & \cdots & 0 & 0 & 0 & 0 & 0 & 0 \\ \vdots & \vdots & \vdots & \vdots & \vdots & \cdots & \vdots & \vdots & \vdots & \vdots & \vdots & \vdots \\ 0 & 0 & 0 & 0 & 0 & \cdots & \sigma_{n-1} & 0 & 0 & 0 & 0 & 0 \\ 0 & 0 & 0 & 0 & 0 & \cdots & 0 & \sigma_{n-1} & 0 & 0 & 0 & 0 \\ 0 & 0 & 0 & 0 & 0 & \cdots & 0 & 0 & \sigma_n & 0 & 0 & 0 \\ 0 & 0 & 0 & 0 & 0 & \cdots & 0 & 0 & 0 & \sigma_n & 0 & 0 \\ 0 & C_1 & 0 & 0 & 0 & \cdots & 0 & 0 & 0 & 0 & m^2\omega^4 & 0 \\ 0 & 0 & C_1 & 0 & 0 & \cdots & 0 & 0 & 0 & 0 & 0 & m^2\omega^4 \end{pmatrix} \quad \text{Eq. (A-2)}$$

where $$C_1 \triangleq -m\omega^2(K_s^* + m\omega^2)$$
$$\sigma_i \triangleq [K_s^* + m(i\omega)^2]^2 + 0.5\zeta^2, \quad i = 0, 1, 2, \ldots, n$$

Let $Q_i \in R^{i \times i}$, $i=1, 1481\ 2, \ldots, 2n+3$, denote the $(2n+3)$ upper left square submatrices of $2Q$. Since $Q_{2n+1}$ is a diagonal matrix with strictly positive entries, we claim $\text{Det}Q_i > 0$, $i=1, 2, \ldots, (2n+1)$. Furthermore, using the relations $$DetM = DetA\ Det[D - CA^{-1}B]$$
$$M^{-1} = \begin{pmatrix} A^{-1} + A^{-1}B(D - CA^{-1}B)^{-1}CA^{-1} & -A^{-1}B(D - CA^{-1}B)^{-1} \\ -(D - CA^{-1}B)^{-1}CA^{-1} & (D - CA^{-1}B)^{-1} \end{pmatrix}$$
$$M \triangleq \begin{pmatrix} A & B \\ C & D \end{pmatrix}$$

we can show $$D\hat{e}tQ_{2n+2} = DetQ_{2n+1}[m^2\omega^4 - (0\ C_1\ 0\ \cdots\ 0)Q_{2n+1}^{-1}(0\ C_1\ 0\ \cdots\ 0)^T]$$
$$= DetQ_{2n+1}m^2\omega^4\left[1 - \frac{(K_s^* + m\omega^2)^2}{(K_s^* + m\omega^2)^2 + 0.5\zeta^2}\right] > 0$$
$$DetQ_{2n+3} = DetQ_{2n+2}[m^2\omega^4 - (0\ 0\ C_1\ 0\ \cdots\ 0)Q_{2n+2}^{-1}(0\ 0\ C_1\ 0\ \cdots\ 0)^T]$$
$$= DetQ_{2n+2}m^2\omega^4\left[1 - \frac{(K_s^* + m\omega^2)^2}{(K_s^* + m\omega^2)^2 + 0.5\zeta^2}\right] > 0$$

Since $\text{Det}Q_i > 0$, $i=1, 2, \ldots, (2n+3)$, we claim that Q is positive definite. This along with the fact that all entries of Q are bounded, enables us to verify that Q satisfies $\alpha_2 I \geq Q \geq \alpha_1 I$, for some positive constants $\alpha_1, \alpha_2$, when I is the identity matrix of dimension of $(2n+3)$. This proves that $Y_{mu}$ is persistently exciting (Khalil, ibid.).

EXAMPLE 4

This example presents simulation results using the method of the present invention to demonstrate the role of bias current excitation in adaptive compensation of synchronous mass unbalance and sensor runout.

The simulation was performed using the non-linear model of the plant, with parameters chosen to match ones in the experimental hardware provided in Table 1 of Example 3. The rotor speed was assumed to be 1500 rpm (25 Hz) and the frequency and amplitude of excitation were chosen to be 10 Hz and 0.2 Amps, respectively. The initial conditions of the rotor were assumed to be $x(0)=-1.0 \times 10^{-4}$ m and $\dot{x}(0)=0.0$ m/sec. The Fourier coefficients of runout and mass unbalance were chosen as $a_0=2.5$, $a_1=19.00\cos 15°=18.35$, $b_1=19.00\sin 15°=4.92$, $a_2=2.50\cos 25°=1.77$, $b_2=2.50\sin 25°=1.77$, $p=100.00\cos 30°=86.60$, and $q=100.00\sin 30°=50.00$, wherein the units are in micrometers.

The simulation results for error gains $\lambda=400$ s$^{-1}$ and $c=1200$ kg/s, runout adaptation gains $\Gamma=\text{diag}(1.4, 3,3,3,3) \times 10^{-7}$ m/N, and mass unbalance adaptation gains $\Gamma^u=\text{diag}(3, 3) \times 10^{-5}$ m/N are shown in FIGS. 5A–5B, 6A–6G, and 7A–7B. In all the figures, the dotted lines are used to denote the time interval over which bias currents are excited, namely, $5 \leq t \leq 35$ s. Under adaptation without excitation, $\bar{a}_0$, $\bar{a}_2, \bar{b}_2$ converge to their true values but $\bar{a}_1, \bar{b}_1, \bar{p}, \bar{q}$ do not. This is evident from the steady state behavior of the estimated coefficients in FIGS. 6A–6G, over the time interval $0 \leq t \leq 5$ s. As a result, rotor geometric centering is not achieved. With 0.2 Amp (about 10% of nominal bias currents) excitation amplitude, synchronous mass unbalance, and sensor runout identification requires about 30 s. The excitation is terminated at t=35 after geometric centering is achieved through feedforward cancellation of both synchronous mass unbalance and sensor runout. This reduces the cyclic stress of the power amplifiers which now produce only the harmonic component required to cancel the mass unbalance force. The harmonic component of the control current is visible in FIGS. 7A–7B for $t \geq 35$ s.

EXAMPLE 5

Experiments were performed to validate the efficacy of the algorithm of the present invention on synchronous runout and mass unbalance compensation.

A schematic of the test rig used for the experiments is shown in FIG. 8 and was manufactured by Revolve Magnetic Bearing, Inc., Calgary, Alberta, Canada. A steel rotor, 43.2 cm in length and 2.5 cm in diameter, with a balance disk for adding trial masses for mass unbalance was used. The rotor was quite rigid with the first flexible mode frequency at approximately 450 Hz, which was six times higher than the bandwidth of the closed-loop system. At one end, the rotor was connected to an absolute encoder using a bellows-type torsionally rigid coupling. Without introducing significant radial forces on the rotor, the coupling accommodates lateral misalignments. The encoder output was used in generating the feedforward terms in our adaptive algorithm. At the other end, the rotor was connected to a motor via a flexible rubber coupling. An optical speed sensor was used to provide feedback to an analog controller unit to maintain speed of the rotor at a constant desired value. The rotor was levitated using two bearings, A and B. Among them, both axes of bearing B were controlled using analog PD controllers. Although both axes of bearing A were computer controlled, mass unbalance and runout was compensated in one of the axes. A PD controller was used to control the rotor along the other axis. The currents in the electromagnets of both bearings were driven by switching power amplifiers, operating with a bandwidth of 1.6 KHz. The physical parameters and operating conditions of bearing A are provided in Table 1.

TABLE 1

| Parameter | Value |
| --- | --- |
| rotor mass, m | 4.87 kg |
| electromagnetic force constant, k | $2.82 \times 10^{-6}$ Nm$^2$/A$^2$ |
| nominal air gap, 1 | $0.508 \times 10^{-3}$ m |
| nominal top coil bias current, $i^*_{10}$ | 2.41 A |
| nominal bottom coil bias current, $i^*_{20}$ | 2.06 A |
| nominal actuator gain, $K^*_c$ | 97.71 N/A |
| nominal magnetic stiffness, $K^*_s$ | $4.33 \times 10^5$ N/m |

The rotor mass enumerated in Table 1 pertains to that of the whole rotor. The adaptive algorithm for synchronous runout and mass unbalance compensation was programmed in a MATLAB/SIMULINK environment (MATLAB/SIMULINK are trademarks of The MathWorks, Inc., Natick, Mass.) and downloaded to a Digital Signal Processor (DSP) board manufactured by dSpace, Inc., Novi, Mich. The sampling rate of the board was set at 13 KHz for on-line identification and control. A separate DSP board sampling at 5 KHz, along with suitable analog circuits, was used for manual identification of runout. The manually identified runout was used to determine the position of the rotor geometric center from the sensor signal.

Implementation procedure. The discussion here and in the next section pertains to the single axis of bearing A in which synchronous mass unbalance and runout were compensated using the adaptive algorithm. Before implementation of the algorithm, the rotor was levitated using a PD controller and runout was manually identified following the procedures outlined in section II-B. Although the first harmonic of runout was significant, higher harmonics of runout were negligible. On the basis of these results, n was set to 1 in the algorithm for estimation of runout.

The experiments were performed with the balance disk at two different locations as shown in FIG. 8. For each location, the algorithm was implemented three times. In Experiment 1, mass unbalance of the rotor was not introduced but was estimated. In line with the discussion in section II-C, a trial mass was added in Experiment 2, and mass unbalance was re-estimated. Experiment 3 was performed by introducing the trial mass at a different phase angle. Although a trial mass was added to the balance disk, mass unbalance was compensated only in bearing A. Since bearing B did not have mass unbalance compensation, two sets of experiments were conducted with the balance disk at two different locations to gain a high level of confidence in our results.

The experiments were performed at constant rotor speed of 1500 rpm (25 Hz). The control law in Eq. (33) and the adaptation laws in Eq. (34) were used with the following choice of gains $\lambda = 400 s^{-1}$, $c = 1200$ kg/s, $\Gamma = \text{diag}(1,4,3,3,3,3) \times 10^{-7}$ m/N,
$\Gamma_u = \text{diag}(3,3) \times 10^{-5}$ m/N The derivative term x in the control law was numerically computed using the transfer function $2500 s/(s+2500)$. This eliminated potential problems arising from infiltration of wideband noise into the sensor signal. During adaptation, the top bias current was excited using $\delta_1 = 0.2 \sin(20 \pi t)$ Amperes. The excitation frequency was therefore less than half of the rotor frequency. After the estimated parameters reached steady state, adaptation and bias current excitation were both discontinued.

In the algorithm, bias currents are excited concurrently with estimation. This eliminates drift in the estimated Fourier coefficients of mass unbalance and the first harmonics of runout in the absence of persistent excitation. Compared to standard implementation, the algorithm requires an extra D/A channel for every axis of implementation since both coils of each axis are excited independently.

TABLE 2

| Sensor runout and unbalance | manual SRO identification Expt. 0 | initial unbalance Expt. 1 | initial unbalance plus trial weight $\epsilon_T = 91.1$ $\theta_T = -50$ Expt. 2 | estimation of trial weight $\epsilon_T = 91.1$ $\theta_T = -60$ Expts. 1, 2 | initial unbalance plus trial weight $\epsilon_T = 91.1$ $\theta_T = 40$ Expt. 3 | estimation of trial weight $\epsilon_T = 91.1$ $\theta_T = 40$ Expts. 1, 3 |
| --- | --- | --- | --- | --- | --- | --- |
| $\bar{a}_0$ | 0.0 | −0.2 | −1.3 | — | −1.1 | — |
| $a_1$ | 40.0 | 40.0 | 40.0 | — | 38.6 | — |
| $b_1$ | 0.0 | −0.7 | 1.5 | — | 0.9 | — |
| Mag., $A_1$ | 40.0 | 40.0 | 40.0 | — | 38.7 | — |
| Phase, $\theta_1$ | 0.0 | −1.0 | 2.1 | — | 1.4 | — |
| $\bar{p}$ | — | 10.9 | 45.0 | — | −21.2 | — |
| $\bar{q}$ | — | 4.1 | 36.8 | — | 36.5 | — |
| Mag., $\epsilon$ | — | 11.6 | 58.2 | 47.3 | 42.2 | 45.6 |
| Phase, $\theta$ | — | −69.4 | −50.7 | −46.2 | 30.2 | 44.7 |

The experiments were first performed with the balance disk located at rotor midspan. The results are provided in Table 2. The first column of data in Table 2 (Expt. 0) pertains to the manually identified values of synchronous sensor runout. This data includes the DC component and the first harmonics of runout only since second and higher harmonics were found to be negligible. The phase of the first harmonic was set to zero through encoder calibration. The second column of data (Expt. 1) corresponds to the experiment performed without a trial mass. This data includes the DC component and first harmonics of runout, and the harmonics of initial mass unbalance of the rotor.

The next two columns of data pertain to the experiment with the addition of a trial mass of eccentricity $\epsilon_T = 91.1$ μm and phase $\theta_T = -56°$ (The trial mass had a mass of 10 gms and was placed at a radial distance of 4.445 cms. Since the mass of the rotor was 4.87 kgs, $\epsilon_T \{0.01/(4.87+0.01)\} \times 0.04445 = 91.1$ μm.). Of these two columns, the left column (Expt. 2)

provides experimentally obtained values of synchronous sensor runout and mass unbalance. The right column provides computed values of mass unbalance solely due to the trial mass. The computed values were obtained in line with the discussion in section II-C, as follows $$\epsilon_T \angle \theta_T = (\epsilon_R \angle \theta_R - \epsilon_U \angle \theta_U) = (86.7\angle -61.3° - 12.9\angle -91.8°) = 75.9\angle -56.4°.$$

The last two columns of data in Table 2 pertain to experimental results obtained with the same trial mass, located at the same radial distance, but at the new phase angle $\theta_T = -146°$. Among these two columns, the left column provides Fourier coefficients of synchronous sensor runout and mass unbalance obtained throughout the experiments (Expt.3). The right column provides computed values of mass unbalance solely due to the trial mass. This data was obtained as follows $$\epsilon_T \angle \theta_T = (\epsilon_R \angle \theta_R - \epsilon_U \angle \theta_U) = (82.1\angle -142.9° - 12.9\angle -91.8°) = 74.7\angle -150.6°.$$

The time history of the rotor geometric center position, x, and sensor signal, $x_s$, are provided in FIGS. 9A and 9B for one of the experiments, Expt. 2. The geometric center position was evaluated from the sensor signal through cancellation of manually identified runout. The time scale in FIGS. 9A and 9B is divided into three distinct regions: (a) $t \leq 0$, where rollout and mass unbalance were not compensated, (b) $0 \leq t \leq 300$, where rollout and mass unbalance were adaptively estimated and compensated, and (c) $t \geq 300$, where rollout and mass unbalance were completely compensated and bias current excitation terminated. Due to the relatively long duration of the experiment, data was acquired over the sub-intervals $-0.2 \leq t \leq 0.3$, $120.0 \leq t \leq 120.5$, and $299.6 \leq t \leq 300.2$. The time trajectories of the estimated Fourier coefficients of rollout and mass unbalance are shown in FIGS. 10A–10E, with final values of the coefficients shown with dashed lines. The sensor rollout coefficients show larger fluctuations than those of mass unbalance. This can be primarily attributed to the difference in scale of the plots.

Interpretation of results. First consider the Fourier coefficients of synchronous sensor runout presented in Table 2. These values, identified by the algorithm, are very similar for Experiments 1, 2, and 3, performed with varying degrees of mass unbalance. Furthermore, the identified coefficients closely match the manually identified values of runout, Expt.0. Therefore, it can be claimed that synchronous sensor runout has been correctly identified.

Next, investigate the estimated magnitude and phase of mass unbalance due to the trial mass alone for the two cases in Table 2. The estimated magnitudes, 75.9 $\mu$m and 74.7 $\mu$m, are similar and, therefore, consistent and their respective phases, $-56.4°$ and $-150.6°$, compare very well with the true values, $-56°$ and $-146°$, respectively. The average value of the estimated magnitudes of mass unbalance, 0 75.3 $\mu$m, is approximately 82% of the trial mass eccentricity of 91.1 $\mu$m, added at rotor midspan. Other than this percentage factor, which will be discussed later, the above data indicates that the algorithm determines the phase of mass unbalance accurately and provides consistent estimates for eccentricity over repeated trials.

Now consider the plot of the rotor geometric center position, x, in FIG. 9A. Although this plot specifically pertains to Experiment 2, it is representative of the general behavior of the rotor geometric center with the algorithm. It can be seen from FIG. 9A that the geometric center initially fluctuates about a nonzero mean value but this fluctuation is virtually eliminated with the algorithm. The stabilization of the rotor geometric center to the origin means that both mass unbalance and synchronous sensor runout have been correctly estimated and compensated.

A second set of experiments were performed with the balance disk closer to Bearing B, as shown in FIG. 8. The results of these experiments, provided in Table 3, are very consistent with the results in Table 2. Specifically, the estimated values of synchronous sensor runout are very similar to the values in Table 2, and closely match the manually identified values. The magnitude of estimated mass unbalance is consistent over repeated trials and the phase of mass unbalance closely match the phase of the trial mass for both experiments. The plots of the rotor geometric center, not shown here due to their similarity with the plot in FIGS. 9A and 9B, also indicate geometric center stabilization.

The ratio between the average magnitude of estimated mass unbalance and trial mass eccentricity is 0.51 for the experimental results in Table 3. Although this value is less than the 0.82 ratio obtained with the balance disk at rotor midspan, as one would expect, both values are higher than expected. An explanation of the higher values would require further analysis that takes into consideration: (a) characterisitcs of the support provided by Bearing B under PD control, in the absence of mass unbalance and synchronous sensor runout compensation, (b) performance of our adaptive algorithm, formally developed for a single degree-of-freedom rotor with collocated sensor and actuator, in our experimental test-rig, and (c) additional stiffness and mass unbalance introduced by the couplers at the two ends of the rotor. It will, however not be worthwhile pursuing such analyses since the adaptive algorithm will have to be extended to a complete rotor model before it can be implemented in any industrial rig. The experimental results amply demonstrate the basic feasibility of the algorithm but work remains to be done before it can be adopted by commercial vendors.

With respect to the time taken for synchronous disturbance compensation, it can be seen from FIGS. 5A–5B and 9A–9B that compensation in simulation requires a shorter time than compensation in experiments. This can be attributed to the fact that only one of the bearings in the experimental setup was compensating the disturbances. The other bearing, in the absence of mass unbalance and synchronous sensor runout compensation, acted as a source of additional periodic disturbances. The time is expected to be reduced significantly when both bearings compensate for disturbances, and amplitude and frequency of bias current excitation are chosen optimally. The time taken for compensation in the experiments, nevertheless, should not be construed as significant. This time will be required during rotor spinup only. During steady state operation, adaptation and bias current excitation will be implemented for a few seconds periodically to account for possible drift in synchronous sensor runout and mass unbalance. Depending upon the type of application, periodic implementation may occur few times every hour to once every few hours.

In most commercial applications for magnetic bearings, the control objective is to stabilize the rotor about its geometric center. This objective requires simultaneous compensation of synchronous sensor runout and mass unbalance, which are periodic disturbances with similar frequency content. In the absence of on-line compensation algorithms, commercial vendors use off-line techniques or a combination of off-line and on-line techniques requiring significant tuning during rotor spinup. A few researchers have proposed on-line estimation algorithms based on variation of rotor speed but applications where speed variation is not permissible preclude their use.

The present invention provides a novel method for synchronous sensor runout and mass unbalance identification and compensation for stabilizing a rotor at its geometric center at a constant rotor speed. The method is based on methodical excitation of the bias currents in opposing electromagnetic coils that enhances observability of the system and enables distinguishing between the synchronous disturbances without altering the equilibrium condition of the rotor. The method of the present invention is mathematically developed for a single degree-of-freedom rotor model and validated through numerical simulations and also experiments on a laboratory test-rig.

The experimental results demonstrate the capability of the algorithm to correctly identify the Fourier coefficients of synchronous sensor runout and mass unbalance and stabilize the rotor to its geometric center. However, further research needs to be done for successful implementation of the algorithm in industrial hardware. Some of these research problems include extension of the algorithm to a four degree-of-freedom rigid rotor model and optimal selection of amplitude and frequency of bias current excitation for faster estimation and convergence. The robustness of the algorithm with respect to variation and uncertainty of parameters needs to be investigated although some degree of robustness has been established through successful implementation of the algorithm in the experiments of this example.

EXAMPLE 6

This example illustrates the operation of the method of the present invention using the computer program provided on the identical CDs: copy 1 entitled "010811$_{\_1041}$" and copy 2 entitled "010811-11038." Each compact disc contains inter alia ASCII text files "data_feb25.m" and "adapt.m" disclosing a computer program and parameter values, respectively, which can be used to demonstrate the method and system of the present invention. The file "data_feb25.m" was created Jul. 17, 2000, and the file contains 2,202 bytes. The file "adpat.m" was created Feb. 27, 2000, and the file contains 137 bytes. The CD contains further files which demonstrate the operation of the present invention.

While the above computer programs and files can be used to practice the method and system of the present invention, the method and system of the present invention is not limited solely to the above computer programs and files. The above computer program and files is an example of one embodiment for performing the method and system of the present invention. The method and system of the present invention can be practiced with any computer program and files that allows the user to perform the method and system of the present invention in substantially the manner as disclosed herein.

Both synchronous disturbances, namely sensor runout and unbalance, are characterized by parameters that are identified for their compensation at a constant rotor speed. Once these parameters have been identified, compensation of sensor runout and unbalance at variable rotor speeds is easily accomplished using standard formula for both disturbances.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A method for simultaneous identification and compensation of sensor runout and mass unbalance of a rotor rotating at a constant speed in a magnetic bearing which is under the control of a controller for controlling the currents in the electromagnetic coils in the magnetic bearing, comprising:

(a) varying the magnetic stiffness of the magnetic bearing by variation of bias currents in the electromagnet coils of the magnetic bearing using an algorithm which causes persistency of excitation for identification of synchronous periodic disturbances such as sensor runout and mass unbalance by continuously varying over time the currents to the electromagnetic coils in the magnetic bearing about their nominal values as a function of an independent time function to generate a series of excitations in the currents levitating a rotor in the magnetic bearing without disturbing the equilibrium of the rotor rotating at the constant speed;

(b) identifying the sensor runout and mass unbalance for an excitation in the series of excitations in the currents using a second algorithm consisting of adaptation laws which determines values for the sensor runout and mass unbalance at the excitation;

(c) compensating for the sensor runout and mass unbalance using an third algorithm that uses the values identified from step (b) to determine a control action that modifies the current levitating the rotor; and (d) repeating steps (a) to (c) until the rotor is stabilized about its geometric center as it is rotating at the constant speed in the magnetic bearing.

2. The method of claim 1 wherein after the rotor has been stabilized about its geometric center, steps (a) to (d) are repeated at a regular interval to maintain the rotor about its geometric center.

3. The method of claim 1 wherein the magnetic bearing is a radial magnetic bearing or a thrust magnetic bearing.

4. The method of claim 1 wherein the algorithm for persistency of excitation nominally chooses bias currents in the opposite magnetic coils to provide a force that cancels weight of the rotor when it is geometrically centered wherein the bias currents nominally satisfy the relation $$k(i^2_{10} - i^2_{20}) = m\bar{g}l^2$$

wherein k is a magnetic force constant, m is the rotor mass, g is acceleration due to gravity in the direction of the axis of the opposed paired electromagnets, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10} = I^*_{10} + \delta_1, \quad i_{20} = I^*_{20} + \delta_2$$

wherein $I^*_{10}$ and $I^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2 = (i^*_{10}/i^*_{20})\delta_1, \quad \delta_1 = A \sin(\omega_e t), \quad \omega_e < \omega$$

wherein A is the amplitude of the bias current excitation, $\omega_e$ is the frequency of the bias current excitation, and $\omega$ is the angular rotation of the rotor.

5. A method for stabilizing a rotor rotating at a constant speed about its geometric center in a magnetic bearing without disturbing the equilibrium of the rotor rotating at the constant speed comprising:

(a) providing a magnetic bearing including plurality of position sensor means wherein each position sensor means provides a signal as a measure of the position of the rotor in the air gap and a plurality of electromagnetic coils of the magnetic bearing;

(b) providing a rotational speed sensor means for determining the speed of the rotor of the magnetic bearing;

(c) providing an angular position sensor means for determining the angular position of the rotor in the magnetic bearing;

(d) providing a generator means for providing currents to each of the electromagnetic coils for levitating the rotor in the magnetic bearing; and (e) providing a controller means including a adaptive control framework which over a period of time is sufficient to stabilize the rotor at its geometric center wherein the adaptive control framework uses a persistency of excitation algorithm to direct the generator means to introduce over time a series of successive excitations provided to the electromagnetic coils wherein each excitation changes the stiffness of the magnetic field of the magnetic bearing which over time generates persistency of excitation without affecting equilibrium of the rotor, which allows the controller means to simultaneously identify synchronous periodic disturbances in the rotor rotating at constant speed for each excitation measured by the position sensors using an adaptation laws algorithm and determine a control action using a control action algorithm that compensates for the synchronous periodic disturbances for the excitation measured by the position sensor which alters the currents provided to the electromagnetic coils by the generator means for levitating the rotor rotating at the constant speed and to drive the rotor to its geometric center which for each successive excitation drives the rotor closer to its geometric center until the rotor is stabilized about its geometric center.

6. The method of claim 5 wherein the periodic disturbances are synchronous sensor runout and mass unbalance.

7. The method of claim 5 wherein after the rotor has been stabilized about its geometric center, the controller at regular intervals redetermines the geometric center of the rotor using the persistency of excitation algorithm, the adaptation laws algorithm, and the control action algorithm to maintain the rotor about its geometric center.

8. The method of claim 5 wherein the magnetic bearing is a radial magnetic bearing or a thrust magnetic bearing.

9. The method of claim 5 wherein the algorithm for persistency of excitation nominally chooses bias currents in the opposite magnetic coils to provide a force that cancels weight of the rotor when it is geometrically centered wherein the bias currents nominally satisfy the relation $$k(i^2_{10}-i^2_{20})=m\bar{g}l^2$$

wherein k is a magnetic force constant, m is the rotor mass, g is acceleration due to gravity in the direction of the axis of the opposed paired electromagnets, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10}=i^*_{10}+\delta_1, i_{20}=i^*_{20}+\delta_2$$

wherein $i^*_{10}$ and $i^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2=(i^*_{10}/i^*_{20})\delta_1, \delta_1=A\sin(\omega_e t), \omega_e<\omega$$

wherein A is the amplitude of the bias current excitation, $\omega_e$ is the frequency of the bias current excitation, and $\omega$ is the angular rotation of the rotor.

10. A method for stabilizing over time a rotor rotating at a constant speed about its geometric center in a magnetic bearing without disturbing the equilibrium of the rotor rotating at the constant speed which comprises:

(a) providing a controller for the magnetic bearing that determines a current to each electromagnetic coils in the magnetic bearing to levitate the rotor about its geometric center; and (b) providing a program for the controller comprising (i) a persistency of excitation algorithm that enables the controller to continuously vary over time the currents to the electromagnetic coils in the magnetic bearing about their nominal values as a function of an independent time function which generates a series of excitations without disturbing the equilibrium of the rotor rotating at the constant speed (ii) an adaptation laws algorithm that enables the controller in response to an excitation in the series and a signal from a position sensor that provides signals corresponding to the position between the rotor and the electromagnetic coils of the magnetic bearing corresponding to the excitation in the series to determine sensor runout and mass unbalance for the rotor rotating at the constant speed; and (iii) a control action algorithm that enables the controller in response to the sensor runout and mass unbalance determined using the adaptation laws algorithm to determine a control action that modifies the currents for levitating the rotor to compensate for the sensor runout and mass unbalance determined for the excitation in the series, wherein the program enables the controller to modify the currents for levitating and stabilizing the rotor about its geometric center.

11. The method of claim 10 wherein the nominal values of bias currents in the opposed paired electromagnetic coils are those that provide a force that cancels the weight of the rotor when the rotor is geometrically centered.

12. The method of claim 10 wherein after the rotor has been stabilized about its geometric center, the controller at regular intervals redetermines the geometric center of the rotor using the persistency of excitation algorithm, the adaptation laws algorithm, and the control action algorithm to maintain the rotor about its geometric center.

13. The method of claim 10 wherein the magnetic bearing is a radial magnetic bearing or a thrust magnetic bearing.

14. The method of claim 10 wherein the algorithm for persistency of excitation nominally chooses bias currents in the opposite magnetic coils to provide a force that cancels weight of the rotor when it is geometrically centered wherein the bias currents nominally satisfy the relation $$k(i^2_{10}-i^2_{20})=m\bar{g}l^2$$

wherein k is a magnetic force constant, m is the rotor mass, g is acceleration due to gravity in the direction of the axis of the opposed paired electromagnets, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10}=i^*_{10}+\delta_1, i_{20}=i^*_{20}+\delta_2$$

wherein $i^*_{10}$ and $i^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2=(i^*_{10}/i^*_{20})\delta_1, \delta_1=A\sin(\omega_e t), \omega_e<\omega$$

wherein A is the amplitude of the bias current excitation, $\omega_e$ is the frequency of the bias current excitation, and $\omega$ is the angular rotation of the rotor.

15. In a magnetic bearing apparatus comprising a stator assembly with a radial arrangement of a plurality of electromagnetic coils mounted in a stator assembly around a cylindrical opening in which a magnetic field is generated by each of the electromagnetic coils for levitating a rotor, the improvement which comprises:

control means for stabilizing the rotor when rotating at a constant speed wherein the control means varies magnetic stiffness of the magnetic bearing by introducing excitations into the currents to the electromagnetic coils wherein the excitations to the current to one of the electromagnetic coils is proportionally related to the excitations to the current to the other electromagnetic coils which generates persistency of excitation without disturbing the equilibrium of the rotor rotating at a constant speed and which enables the control means to simultaneously identify and compensate for sensor runout and mass unbalance in determining a control action for stabilizing the rotor about its geometric center.

16. The method of claim 15 wherein the algorithm for persistency of excitation nominally chooses bias currents in the opposite magnetic coils to provide a force that cancels weight of the rotor when it is geometrically centered wherein the bias currents nominally satisfy the relation $$k(i^2_{10}-i^2_{20})=m\bar{g}l^2$$

wherein k is a magnetic force constant, m is the rotor mass, g is acceleration due to gravity in the direction of the axis of the opposed paired electromagnets, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10}=i^*_{10}+\delta_1, i_{20}=i^*_{20}+\delta_2$$

wherein $i^*_{10}$ and $i^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2=(i^*_{10}/i^*_{20})\delta_1, \delta_1=A\sin(\omega_e t), \omega_e<\omega$$

wherein A is the amplitude of the bias current excitation, $\omega_e$ is the frequency of the bias current excitation, and $\omega$ is the angular rotation of the rotor.

17. A computer simulation model for determining the parameters for stabilizing a rotor rotating at a constant speed in a magnetic bearing apparatus, comprising:

(a) providing a computer program comprising (i) a persistency of excitation algorithm that continuously varies over time the currents to the electromagnetic coils in the magnetic bearing about their nominal values as a function of an independent time function which generates a series of excitations without disturbing the equilibrium of the rotor rotating at the constant speed;

(ii) an adaptation laws algorithm that in response to an excitation in the series and a signal corresponding to the rotor position in the air gap between the rotor and the electromagnetic coils corresponding to the excitation in the series determines sensor runout and mass unbalance for the rotor rotating at the constant speed; and (iii) a control action algorithm that in response to the sensor runout and mass unbalance determined using the adaptation laws algorithm to determine a control action that modifies the currents for levitating the rotor to compensate for the sensor runout and mass unbalance determined for the excitation in the series, wherein the program modifies the currents for levitating the rotor and stabilizing the rotor about its geometric center.

18. The computer simulation model of claim 17 wherein the magnetic bearing is a radial magnetic bearing or a thrust magnetic bearing.

19. The computer simulation model of claim 17 wherein the algorithm for persistency of excitation nominally chooses bias currents in the opposite magnetic coils to provide a force that cancels weight of the rotor when it is geometrically centered wherein the bias currents nominally satisfy the relation $$k(i^2_{10}-i^2_{20})=m\bar{g}l^2$$

wherein k is a magnetic force constant, m is the rotor mass, g is acceleration due to gravity in the direction of the axis of the opposed paired electromagnets, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10}=i^*_{10}+\delta_1, i_{20}=i^*_{20}+\delta_2$$

wherein $i^*_{10}$ and $i^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2=(i^*_{10}/i^*_{20})\delta_1, \delta_1=A\sin(\omega_e t), \omega_e<\omega$$

wherein A is the amplitude of the bias current excitation, $\omega_e$ is the frequency of the bias current excitation, and $\omega$ is the angular rotation of the rotor.

20. A system for simultaneous identification and compensation of sensor runout and mass unbalance of a rotor rotating at a constant speed in a magnetic bearing which is under the control of a controller for controlling the currents to the electromagnetic coils in the magnetic bearing, comprising:

(a) varying the magnetic stiffness of the magnetic bearing by excitation of currents in the electromagnet coils of the magnetic bearing using an algorithm which causes persistency of excitation for identification of the synchronous disturbances, such as sensor runout and unbalance, by continuously varying over time the currents to the electromagnetic coils in the magnetic bearing about their nominal values as a function of an independent time function to generate a series of excitations in the currents levitating a rotor in the magnetic bearing without disturbing the equilibrium of the rotor rotating at the constant speed;

(b) identifying the sensor runout and mass unbalance for an excitation in the series of excitations in the currents using a second algorithm consisting of adaptation laws which determines values for the sensor runout and mass unbalance at the excitation;

(c) compensating for the sensor runout and mass unbalance using a third algorithm that uses the values from step (b) to determine a control action that modifies the current levitating the rotor; and (d) repeating steps (a) to (c) until the rotor is stabilized about its geometric center as it is rotating at the constant speed in the magnetic bearing.

21. The system of claim 20 wherein after the rotor has been stabilized about its geometric center, steps (a) to (d) are repeated at a regular interval maintain the rotor about its geometric center.

22. The system of claim 20 wherein the magnetic bearing is a radial magnetic bearing or a thrust magnetic bearing.

23. The system of claim 20 wherein the algorithm for persistency of excitation nominally chooses bias currents in the opposite magnetic coils to provide a force that cancels weight of the rotor when it is geometrically centered wherein the bias currents nominally satisfy the relation $$k(i^2_{10} - i^2_{20}) = m\bar{g}l^2$$

wherein k is a magnetic force constant, m is the rotor mass, g is acceleration due to gravity in the direction of the axis of the opposed paired electromagnets, l is nominal air gap between the rotor and electromagnetic coils, and $i_{10}$ and $i_{20}$ are the bias currents for the opposite electromagnetic coils, and then the excitations in the opposite electromagnetic coils are determined according to the relations $$i_{10} = i^*_{10} + \delta_1, \quad i_{20} = i^*_{20} + \delta_2$$

wherein $i^*_{10}$ and $i^*_{20}$ are constants and $\delta_1$ and $\delta_2$ are the bias current excitations which are of small magnitude and wherein to prevent rotor oscillation due to the bias current excitations, $\delta_1$ and $\delta_2$ are chosen according to the relation $$\delta_2 = (i^*_{10}/i^*_{20})\delta_1, \quad \delta_1 = A\sin(\omega_e t), \quad \omega_e < \omega$$

wherein A is the amplitude of the bias current excitation, $\omega_e$ is the frequency of the bias current excitation, and $\omega$ is the angular rotation of the rotor.

24. The method of claim 1 wherein after identification of the sensor runout and unbalance the speed of the rotor is changed and the rotor continues to be levitated and stabilized about the geometric center.

25. The system of claim 20 wherein after identification of the sensor runout and unbalance the speed of the rotor is changed and the rotor continues to be levitated and stabilized about the geometric center.

26. The method of claim 17 wherein after identification of the sensor runout and unbalance the speed of the rotor is changed and the rotor continues to be levitated and stabilized about the geometric center.

* * * * *

UNITED STATES PATENT AND TRADEMARK OFFICE
CERTIFICATE OF CORRECTION

PATENT NO. : 6,763,285 B2
DATED : July 13, 2004
INVENTOR(S) : Joga Dharma Setiavan and Ranjan Mukherjee It is certified that error appears in the above-identified patent and that said Letters Patent is hereby corrected as shown below:

Column 1,
Line 30, "file "adpat.m" was" should be -- file "adapat.m" was --.

Column 7,
Line 5, "$i_{10} = i^*_{10} = \delta_1, i_{20} = i^*_{20} + \delta_2$" should be -- $i_{10} = i^*_{10} + \delta_1, i_{20} = i^*_{20} + \delta_2$ --.

Column 13,
Line 49, "positioned long" should be -- positioned along --.

Column 15,
Line 43, "$E=\{E_0+E_1+E_2+..=A_0+A_1 \sin(\theta+\theta_1)+A_2 \sin(2\theta+\theta_2)+$" should be -- $E=\{E_0+E_1+E_2+..=A_0+A_1 \sin(\theta+\theta_1)+A_2 \sin(2\theta+\theta_2)+...$ --.

Column 18,
Lines 27 and 28, "$(\bar{e}, \phi, \phi_u)$" should be -- $(\bar{e}, \tilde{\phi}, \tilde{\phi}_u)$ --.

Line 47, "$(\bar{e}, \phi, \phi_u, t)$" should be -- $(\bar{e}, \tilde{\phi}, \tilde{\phi}_u, t)$ --.
Line 67, "$(Y_\alpha^T \tilde{\phi}_\alpha + Y_u^T \tilde{\phi}_u) \to 0$" should be -- $(Y_\alpha^T \tilde{\phi}_\alpha + Y_u^T \tilde{\phi}_u) \to 0$ --.

Column 19,
Line 5, "$(Y_\alpha^T \tilde{\phi}_\alpha + Y_u^T \tilde{\phi}_u) \to 0$" should be -- $(Y_\alpha^T \tilde{\phi}_\alpha + Y_u^T \tilde{\phi}_u) \to 0$ --.

Line 7, "$Y_E \phi_E \to 0$" should be -- $Y_E \tilde{\phi}_E \to 0$ --.

Line 19, "$[K_s + m(2\omega)^2] (\sin(n\omega t)$" should be -- $[K_s + m(n\omega)^2]\sin(n\omega t)$ --.
Line 20, "$[k_s + m(2\omega)^2] \cos(n\omega t)$" should be -- $[K_s + m(n\omega)^2] \cos(n\omega t)$ Line 23, "$\phi_\alpha, \to \phi_\beta$" should be -- $\tilde{\phi}_\alpha, \tilde{\phi}_\beta$ --.

Line 33, "$\phi_E \to^0$" should be -- $\tilde{\phi}_E \to^0$ --.

Line 34, "$\phi_\beta$ and $\phi_E$" should be -- $\tilde{\phi}_\beta$ and $\tilde{\phi}_E$ --.

Line 48, "$\phi_\alpha$ and $\phi_u$" should be -- $\tilde{\phi}_\alpha$ and $\tilde{\phi}_u$ --.

Line 55, "$i_{10} = i^*_{10} + \delta_1, i_{20} = u^* + \delta_2$" should be -- $i_{10} = i^*_{10} + \delta_1, i_{20} = i^*_{20} + \delta_2$ --

UNITED STATES PATENT AND TRADEMARK OFFICE
CERTIFICATE OF CORRECTION

PATENT NO.      : 6,763,285 B2
DATED           : July 13, 2004
INVENTOR(S)     : Joga Dharma Setiavan and Ranjan Mukherjee It is certified that error appears in the above-identified patent and that said Letters Patent is hereby corrected as shown below:

Column 22,
Lines 34 and 35, "$(\bar{e}, \phi, \phi_u)$" should be -- $(\bar{e}, \tilde{\phi}, \tilde{\phi}_u)$ --.

Lines 38, 43, and 59, "$(\bar{e}, \phi, \phi_u)$" should be -- $(\bar{e}, \tilde{\phi}, \tilde{\phi}_u)$ --.

Column 23,
Line 25, "$\phi, \phi_u \to 0$" should be -- $\tilde{\phi}, \tilde{\phi}_u \to 0$ --.

Lines 28 and 29, "$(\bar{x}, \bar{e}, \phi, \phi_u)$" should be -- $(\bar{x}, \bar{e}, \tilde{\phi}, \tilde{\phi}_u)$ --.
Line 51, "$(\bar{x}, \bar{e}, \phi, \phi_u)$" should be -- $(\bar{x}, \bar{e}, \tilde{\phi}, \tilde{\phi}_u)$ --.

Line 57, "$(x, \dot{x}, \phi, \phi_u)$ $(0,0,0,0)$" should be -- $(x, \dot{x}, \tilde{\phi}, \tilde{\phi}_u) = (0,0,0,0)$ --.
Line 61, "$(x, \dot{x}, \phi, \phi_u)$ $(0,0,0,0)$" should be -- $(x, \dot{x}, \tilde{\phi}, \tilde{\phi}_u)$ --.

Column 24,
Line 1, "$(x, \dot{x}, \phi, \phi_u)$" should be -- $(x, \dot{x}, \tilde{\phi}, \tilde{\phi}_u)$ --.

Line 24, "$(x, \dot{x}, \phi, \phi_u)$" should be -- $(x, \dot{x}, \tilde{\phi}, \tilde{\phi}_u)$ --.
Line 25, "$(x, \dot{x}, \phi, \phi_u)$" should be -- $(x, \dot{x}, \tilde{\phi}, \tilde{\phi}_u)$ --.
Line 26, "$(\bar{x}, \bar{e}, \phi, \phi_u)$" should be -- $(\bar{x}, \bar{e}, \tilde{\phi}, \tilde{\phi}_u)$ --.
Line 28, "$(\bar{x}, \bar{e}, \phi, \phi_u)$ to $(x, \dot{x}, \phi, \phi_u)$" should be -- $(\bar{x}, \bar{e}, \tilde{\phi}, \tilde{\phi}_u)$ to $(x, \dot{x}, \tilde{\phi}, \tilde{\phi}_u)$ --.

Column 25,
Line 25, "$Qi \; \varepsilon \; R^{ixi}$, $i = 1, 1481 \; 2,...,2n + 3$," should be -- $Qi \; \varepsilon \; R^{ixi}$, $i = 1,2,..., 2n + 3$, --.

Column 28,
Line 21, "sin (20 nt)" should be -- sin (20 $\pi$t) --.
Table 2, Column 5, Line 37, "$\theta_T = -60$" should be -- $\theta_T = -50$- --.

UNITED STATES PATENT AND TRADEMARK OFFICE
CERTIFICATE OF CORRECTION

PATENT NO. : 6,763,285 B2
DATED : July 13, 2004
INVENTOR(S) : Joga Dharma Setiavan and Ranjan Mukherjee It is certified that error appears in the above-identified patent and that said Letters Patent is hereby corrected as shown below:

<u>Column 31,</u>
Line 36, "010811-110385."" should be -- "010811-1038." --
Line 42, "adpat,m" should be -- "adapat.m" --.

Signed and Sealed this

Nineteenth Day of October, 2004

JON W. DUDAS
*Director of the United States Patent and Trademark Office*